United States Patent
Bradford, III et al.

(10) Patent No.: US 10,761,878 B2
(45) Date of Patent: Sep. 1, 2020

(54) SKI GENIE TRAINING APPARATUS AND METHODS OF USE

(71) Applicants: Henry Bernard Bradford, III, Staunton, VA (US); Sandra Jean Catchings, Staunton, VA (US); William Catchings Bradford, Staunton, VA (US)

(72) Inventors: Henry Bernard Bradford, III, Staunton, VA (US); Sandra Jean Catchings, Staunton, VA (US); William Catchings Bradford, Staunton, VA (US)

(*) Notice: Subject to any disclaimer, the term of this patent is extended or adjusted under 35 U.S.C. 154(b) by 0 days.

(21) Appl. No.: 16/266,107

(22) Filed: Feb. 3, 2019

(65) Prior Publication Data

US 2019/0171480 A1    Jun. 6, 2019

Related U.S. Application Data

(62) Division of application No. 14/953,149, filed on Nov. 27, 2015.

(60) Provisional application No. 62/084,557, filed on Nov. 26, 2014.

(51) Int. Cl.
*A63B 69/18* (2006.01)
*G06F 9/46* (2006.01)
*G06F 12/0817* (2016.01)
*G06F 12/084* (2016.01)

(52) U.S. Cl.
CPC .............. *G06F 9/467* (2013.01); *A63B 69/18* (2013.01); *G06F 12/084* (2013.01); *G06F 12/0828* (2013.01); *G06F 2212/314* (2013.01); *G06F 2212/621* (2013.01)

(58) Field of Classification Search
CPC ....... A63B 22/20; A63B 69/18; A63B 69/182; A63B 69/185; A63B 69/187; A63B 2069/185
USPC ........................................................ 434/253
See application file for complete search history.

(56) References Cited

U.S. PATENT DOCUMENTS

| | | | |
|---|---|---|---|
| 2,274,081 A | 2/1942 | Mautin | |
| 2,573,808 A | 11/1951 | Ravoire | |
| 2,657,055 A * | 10/1953 | Denham | A63B 69/18 482/71 |
| 3,467,374 A * | 9/1969 | Auer | A63B 69/18 482/71 |

(Continued)

*Primary Examiner* — Joseph B Baldori
(74) *Attorney, Agent, or Firm* — Norton IP Law Firm LLC; Taylor M. Norton

(57) ABSTRACT

Snow ski training methods with an apparatus are provided, including a snow ski training apparatus having two elongated freely rotatable overlapping ski arms pivotally mounted to a single vertical pivot point shaft fixed at the point of overlap on a sliding pivotal point assembly. Each ski arm has a foot pad with laces configured to receive a foot of a user at the tail end of each ski arm. Disclosed methods include placing a left foot and right foot of a user atop respective foot pads, assuming a hip flexed position, extending the hip and knees of the user until the user achieves an elevated position, laterally maneuvering the user's body through the user's sagittal plane while in the elevated position and around the single pivot point assembly, tangentially moving the user's feet along a congruent and overlapping arc, and returning to another hip flexed position.

8 Claims, 19 Drawing Sheets

(56) References Cited

U.S. PATENT DOCUMENTS

| | | | |
|---|---|---|---|
| 3,475,021 A * | 10/1969 | Ruegsegger | A63B 69/18 482/71 |
| 3,524,641 A | 8/1970 | Ossenkop | |
| 3,531,110 A * | 9/1970 | Marchu | A63B 69/18 482/71 |
| 3,547,434 A | 12/1970 | Ossenkop | |
| 3,582,066 A | 6/1971 | Keryluk | |
| 3,591,172 A * | 7/1971 | Hude | A63B 69/18 482/71 |
| 3,650,528 A * | 3/1972 | Natterer | A63B 69/18 482/71 |
| 3,707,283 A * | 12/1972 | Cormier | A63B 69/18 482/71 |
| 3,708,163 A * | 1/1973 | Hynes | A63B 69/18 482/71 |
| 4,074,903 A | 2/1978 | Diez de Aux | |
| 4,092,787 A | 6/1978 | Kaempfen | |
| 4,342,453 A * | 8/1982 | Wagner | A63B 69/18 434/253 |
| 4,396,189 A * | 8/1983 | Jenkins | A63B 69/18 434/253 |
| 4,453,742 A * | 6/1984 | Zepkowski | A63C 5/16 280/22.1 |
| 4,595,195 A * | 6/1986 | Miehlich | A63B 69/18 434/253 |
| 4,607,839 A | 8/1986 | Knudson | |
| 4,645,202 A * | 2/1987 | Tomba | A63B 69/18 482/71 |
| 4,669,723 A | 6/1987 | Arsenian | |
| 4,743,014 A | 5/1988 | Loane | |
| 4,744,557 A * | 5/1988 | Smirmaul | A63B 69/18 434/253 |
| 4,795,146 A * | 1/1989 | Donnerstag | A63B 22/0061 434/253 |
| 4,846,463 A * | 7/1989 | Kleinnibbelink | A63B 69/18 482/71 |
| 4,869,496 A * | 9/1989 | Colombo | A63B 69/18 482/71 |
| 4,993,704 A * | 2/1991 | Luczynski | A63B 69/18 434/253 |
| 5,147,257 A | 9/1992 | Loane | |
| 5,284,460 A * | 2/1994 | Miller | A63B 21/151 482/145 |
| 5,316,530 A * | 5/1994 | Romer | A63B 69/18 482/130 |
| 5,374,228 A * | 12/1994 | Buisman | A63B 69/18 482/51 |
| 5,391,130 A * | 2/1995 | Green | A63B 21/00072 482/112 |
| 5,496,239 A * | 3/1996 | Kallman | G09B 9/02 482/51 |
| 5,601,434 A * | 2/1997 | Winters | A63B 69/0064 434/253 |
| 5,692,995 A * | 12/1997 | Alvarez | A63B 22/0069 434/253 |
| 5,749,811 A * | 5/1998 | Wilson | A63B 69/18 434/253 |
| 5,895,340 A * | 4/1999 | Keller | A63B 24/00 434/253 |
| 5,911,650 A * | 6/1999 | Cox | A63B 21/023 482/51 |
| 6,106,442 A * | 8/2000 | Tissue | A63B 21/157 482/51 |
| 6,231,484 B1 * | 5/2001 | Gordon | A63B 69/18 482/51 |
| 7,115,073 B2 * | 10/2006 | Nizamuddin | A63B 21/055 482/51 |
| 9,682,278 B2 * | 6/2017 | Jones | A63B 22/0061 |
| 2005/0266964 A1 * | 12/2005 | Teng | A63B 2/0061 482/71 |
| 2006/0247105 A1 * | 11/2006 | Baydzhanov | A63B 69/18 482/71 |
| 2012/0270194 A1 * | 10/2012 | Kuijpers | A63B 21/0053 434/253 |

* cited by examiner

SKI GENIE TRAINING APPARATUS AND METHODS OF USE

CROSS REFERENCE TO RELATED APPLICATIONS

This application is a divisional continuation commonly owned U.S. application Ser. No. 14/953,149, filed Nov. 27, 2015, which claims the benefit of priority of U.S. Provisional Application No. 62/084,557, filed Nov. 26, 2014, and all of the contents of each application identified above is hereby incorporated herein by reference in its entirety.

FIELD OF THE INVENTION

The present invention generally relates to training and exercising devices for snow skiers. More specifically, the present invention relates to devices providing pivoting motions affording a person an opportunity to lean to snow ski through guided muscle learning.

BACKGROUND

In recent years, ski-training devices have become increasingly popular. A number of devices have been developed to facilitate the practice of snow skiing.

Previous inventions in this field have covered individual skiing motions, but have been unable to provide the sum total motion of parallel snow skiing. A few of these previous simulators have a fixed vertical structural arc in the middle of the device in the center plane of the user, producing an unnatural motion for the skiers feet to climb and causing his or her weight to be unintentionally thrown backwards.

Other devices have all suffered from many disadvantages, and particularly from the lack of adjustability and flexibility. It would therefore be desirable to provide methods and an apparatus that allows for more of a direction correlation to how a skier learns to ski and how a skier's feet actually move as a skier's feet slide across snow.

Some current ski devices have a pivot point on a track structure directly under the center of the foot and others have two foot pedals directed connected, allowing for no independent action. Embodiments of the snow ski training apparatus of the present invention have a more improved duplication of actual snow skiing because the true radial pivot point for learning to parallel ski is established at the front of the ski of both feet operating independently.

While some of the state of the art ski devices supply their own power and motion for the skier to follow, in actual snow skiing, the snow skier supplies the power and motion for each turn. Another objective of the snow ski training apparatus of the present invention is to train and exercise the specific muscles needed to downhill parallel snow ski, which embodiments of the present invention accomplish by allowing the skier to initiate the requisite power in each gently guided turn.

The ski machine of this present invention overcomes prior limitations and obstacles by mixing all elements of parallel skiing into a smoothly combined side to side, up to down, and front to back motion, duplicating the same type of physical movement encountered while actually downhill parallel skiing in the snow.

When a user adopts and implements the movement he/she learns on the snow ski training apparatus of the present invention to actual downhill snow skiing, he/she will have learned to parallel snow ski much more easily, safer and quicker.

SUMMARY OF THE INVENTION

Embodiments of the present invention are directed to a snow ski training apparatus and methods of teaching snow skiing as disclosed herein, which allows a skier to learn and train on how to snow ski quicker and more accurately that was possible before.

In a preferred embodiment, unparallel ski arms are rotationally disposed on a sliding pivot point assembly. In a preferred embodiment, the ski arms selectively overlap substantially near the nose of the ski arms, at a point that closely surrounds and connects to the pivot shaft of the sliding pivot point assembly. In such an embodiment, the ski arms do not move parallel to one another, yet embodiments of the present invention provide an improved ski training apparatus and enable an improved teaching of downhill parallel snow skiing.

In a preferred embodiment, the frame of the sliding pivot point assembly generally has the form of a reverse U-shaped frame, and a cylindrical shaft is connected to the pivot point frame which glidingly engages a plurality of roller wheels enabling axial movement of the pivot point assembly in the longitudinal direction of a T-Beam which supports the sliding pivot point assembly.

Preferably, there are four roller wheels engaging the bottom surface of the flange of the T-beam, where those roller wheels are positioned between each side wall of the reverse U-shaped frame. Preferably, there is one roller wheel engaging the top surface of the flange of the T-beam, such roller wheel being positioned between the two opposing vertical walls of the reverse U-shaped frame. From a side view, in a preferred embodiment, the frame of the assembly has a substantially trapezoidal shape. The bottom rollers operationally engage the bottom side of the flange of the T-Beam, and the top roller wheel engages the top side of the flange of the T-Beam.

In embodiments of the present invention, the skier's body (frontal or coronal plane) is free to move forward and backward, as the sliding pivot point assembly slideably moves forward and backward along the horizontal T-beam member in relation to the ground.

Embodiments of the present invention overcome prior obstacles since the sliding pivot point assembly comprises a vertically extending cylindrical pivot point shaft fixed atop the support frame providing a single pivot point vertical axis that is capable of longitudinal movement (as described in further detail below along with drawings) along the longitudinal axis of the T-beam.

Preferably, the ski arms are provided with adjustment holes spaced axially along the longitudinal axis of each respective ski arm, to allow for adjustment in length of each ski arm with respect to the sliding pivot point axis, where such length is measured between the selected hole of the ski arm positioned around the vertical pivot point shaft to the tail end of the ski arm to which a foot pad is connected and selectively positioned.

In a preferred embodiment, there is an elastic band attached on one end to an eye-bolt extending above the front column support of the apparatus and the other end of the elastic band is securely laced around the lower section of the cylindrical pivot point shaft. The elastic band enables repositioning of the sliding pivot point assembly during training and operation of the ski training apparatus by the user.

One embodiment of the present invention provides for an interchangeable landing base pad, that has the nature of a cushion, attached to the bottom of the foot pad. The landing base pad is interchangeable such that users can interchange the base pads so as to utilize different pads having varying widths.

For the method claim, vertically free floatingly positioned above the ground means that there is no vertical load bearing support structure beneath the foot pads, and the foot pads are in an elevated position elevated above the ground.

A method for teaching the art of parallel snow skiing is provided using the disclosed embodiments of the ski trainer apparatus having two elongated and unparallel ski arms. Each ski arm has a foot pad connected to a heel rest with laces configured to receive a foot of a user at the tail end of each ski arm. A user places his/her feet securely upon the two footpads selectively attached to the ends of the respective ski arms, which are freely rotatable and overlap each other at a point where the ski arms are pivotally mounted to a single vertical pivot point shaft that is fixed to the sliding pivotal point assembly, enabling the foot pads to rotate about the same pivot point, and thus enabling the foot pads and respective feet of the user of the ski training apparatus to rotate along the same, congruent and overlapping arc.

In a preferred embodiment, the sliding pivot point assembly is configured for movement along a longitudinal axis of a supporting T-beam, thereby allowing the user's body and feet to actually move backward and forward through the user's frontal (or coronal) plane, while also radially guiding and maintaining both of the user's feet within the same overlapping arc.

One preferred embodiment of the present invention provides for an interchangeable landing base cushion pad, attached to the bottom of the foot pad by fasteners, where each interchangeable landing base pad could be a different width. In a preferred embodiment, each foot pad preferably comprises a landing base cushion pad beneath the foot pad to engage the ground and provide stability to a user as well as to absorb impact during a landing of a user during methods of operation of the ski training apparatus.

Since the landing base pad can be of interchangeable widths, one embodiment of the present invention would facilitate better balance for the user depending on the strength, skill level, and experience of the user. For example, in one embodiment, a novice user, or a user with weak ankles, could preferably utilize a wide landing base pad, which would allow for additional stability, in the operation of the ski training apparatus. An experienced user, or a user with strong ankles, could preferably utilize a narrow landing base pad, which would require more balance by the user and allow for motion more similar to actual downhill snow skiing. In a steady position, the landing base pad rests and balances upon the ground.

In embodiments of the present invention, a user does not ride side to side on the tracks of a machine like in current ski devices, but instead the skier is allowed to freely jump side to side closely mimicking the movement of parallel snow skiing. Jumping laterally means jumping in a direction oriented through the user's median or sagittal plane.

In a preferred embodiment, an achievement disc is fixed to the lower section of the cylindrical pivot point shaft, and the achievement disc has a plurality of markings of angles inscribed thereon providing correlation between angles achieved in operation of the apparatus with varying degrees of difficulty of downhill turns in assimilation of parallel snow skiing.

These and other features, aspects, and advantages of the present invention will become better understood with reference to the following description and appended claims.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

For purposes of clarity and orientation with respect to a person, referred to herein as a user, it is noted that a transverse (also known as axial or horizontal) plane is an X-Z plane, parallel to the ground (which in humans separates the superior from the inferior, or put another way, the head from the feet). A frontal (also known as coronal) plane is a Y-X plane, perpendicular to the ground, which (in humans) separates the anterior from the posterior, the front from the back, the ventral from the dorsal. A sagittal (also known as lateral) plane is an Y-Z plane, perpendicular to the ground, which separates left from right.

Referring initially to FIGS. 1-4, the basic constructional details and principles of operation of the ski training apparatus 100 for learning the art of parallel snow skiing according to a preferred embodiment of the present invention will be discussed.

Figure 1:
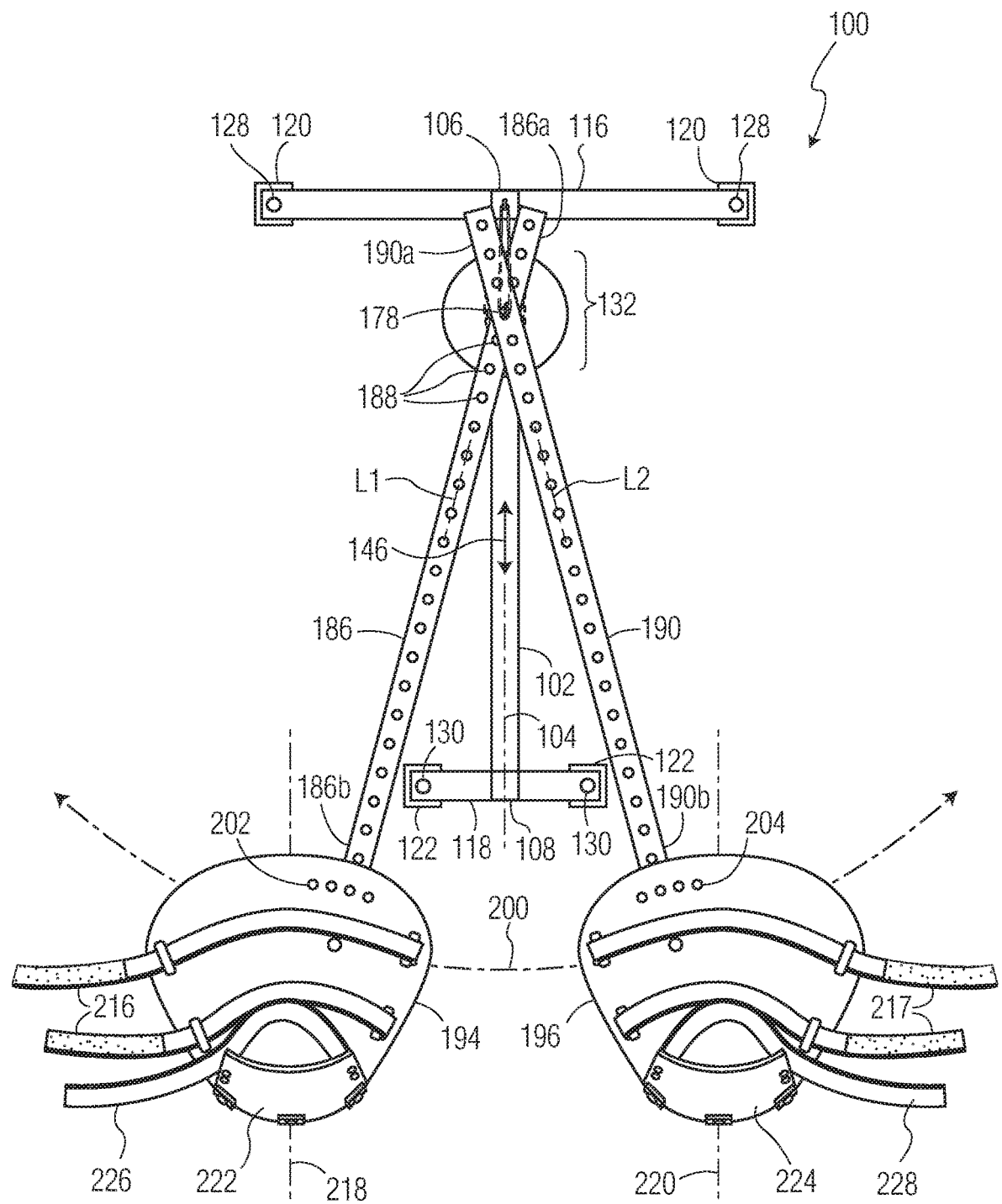
FIG. 1 illustrates a top view of an exemplary ski trainer apparatus, according to a preferred embodiment of the present invention.

In FIG. 1, a ski training apparatus 100 according to a preferred embodiment of the present invention is provided. In FIG. 1, the ski training apparatus 100 comprises a longitudinal T-beam 102 having a central axis 104 aligned generally from front to rear of the apparatus 100, and the T-beam 100 is mounted and supported between a front support column 106 and a rear support column 108. The front column 106 and rear column 108 are disposed vertically in relation to the ground 110. The front column 106 preferably comprises a vertically extending eye-bolt 107 positioned above the horizontal (axial) plane of the top of the T-beam 100, as can be seen in FIG. 2.

In one embodiment, for additional stability of the support columns 106, 108 connected to each end of the T-beam 102, the support columns 106, 108 rest atop wide pads 113, 115 disposed on the ground 110 directly beneath and substantially perpendicular to the support columns 106, 108. In another embodiment, the front column 106 and rear column 108 are configured to have spike-type ends 112, 114 that can be driven into the ground 110 for additional stability. In another embodiment, the ski training apparatus 100 comprises substantially flat cross braces 116, 118 disposed substantially perpendicular to and connected to the bottom of the support columns 106, 108, for additional lateral stability against forces exerted upon the support columns 106, 108 during a user's operation of the apparatus. In such an embodiment, the substantially flat cross braces 116, 118 comprise support pads 120, 122 disposed at the ends of the cross braces 116, 118, as illustrated in FIG. 1. In a further embodiment, the cross braces 116, 118 and the support pads 120, 122 disposed at the ends of the cross braces 116, 118 comprise holes 124, 126 sized to closely surround stakes 128, 130 that can be driven into the ground 110 for additional stability.

Figure 2:
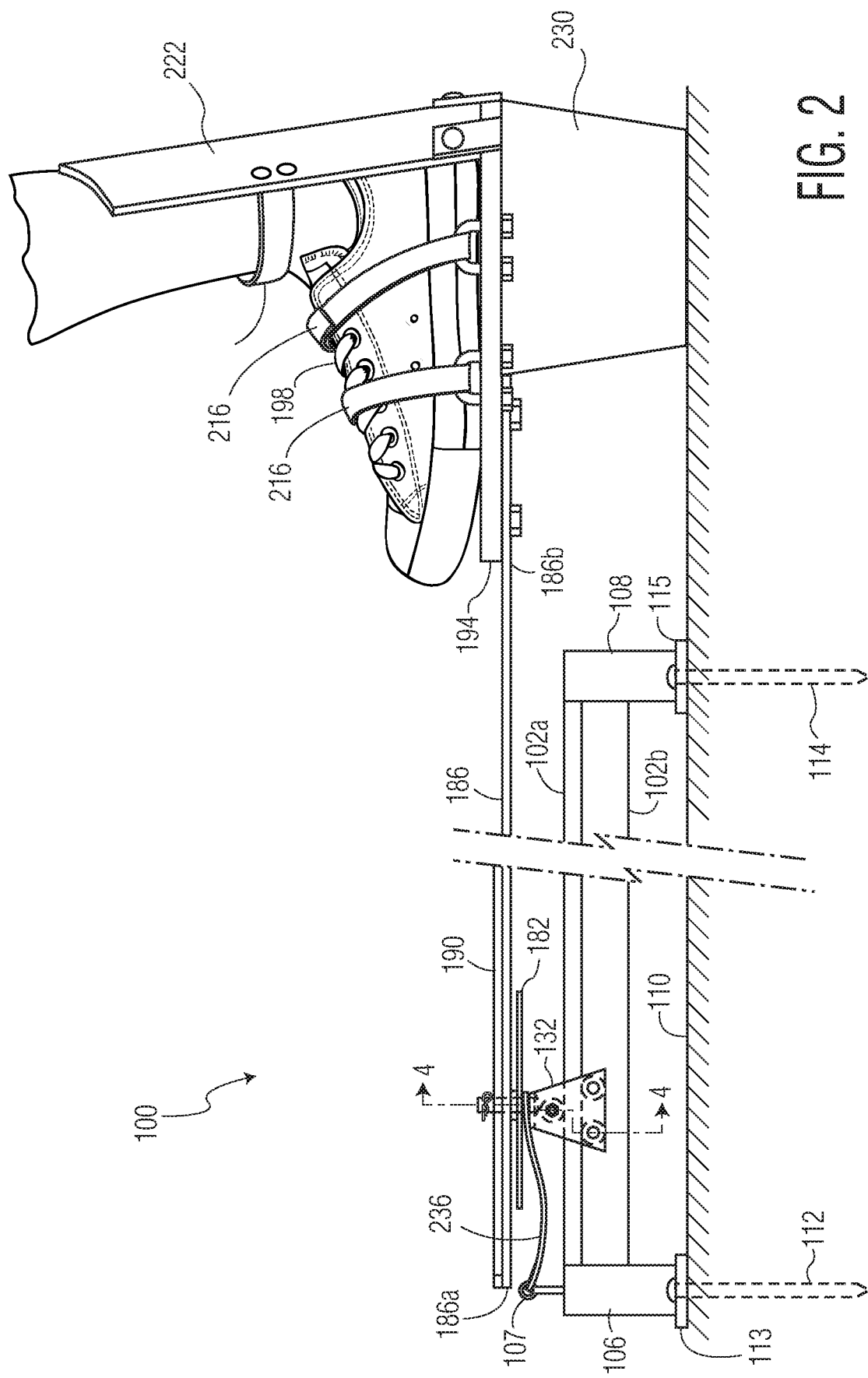
FIG. 2 illustrates a side view of an exemplary ski trainer apparatus, according to a preferred embodiment of the present invention.
Figure 3:
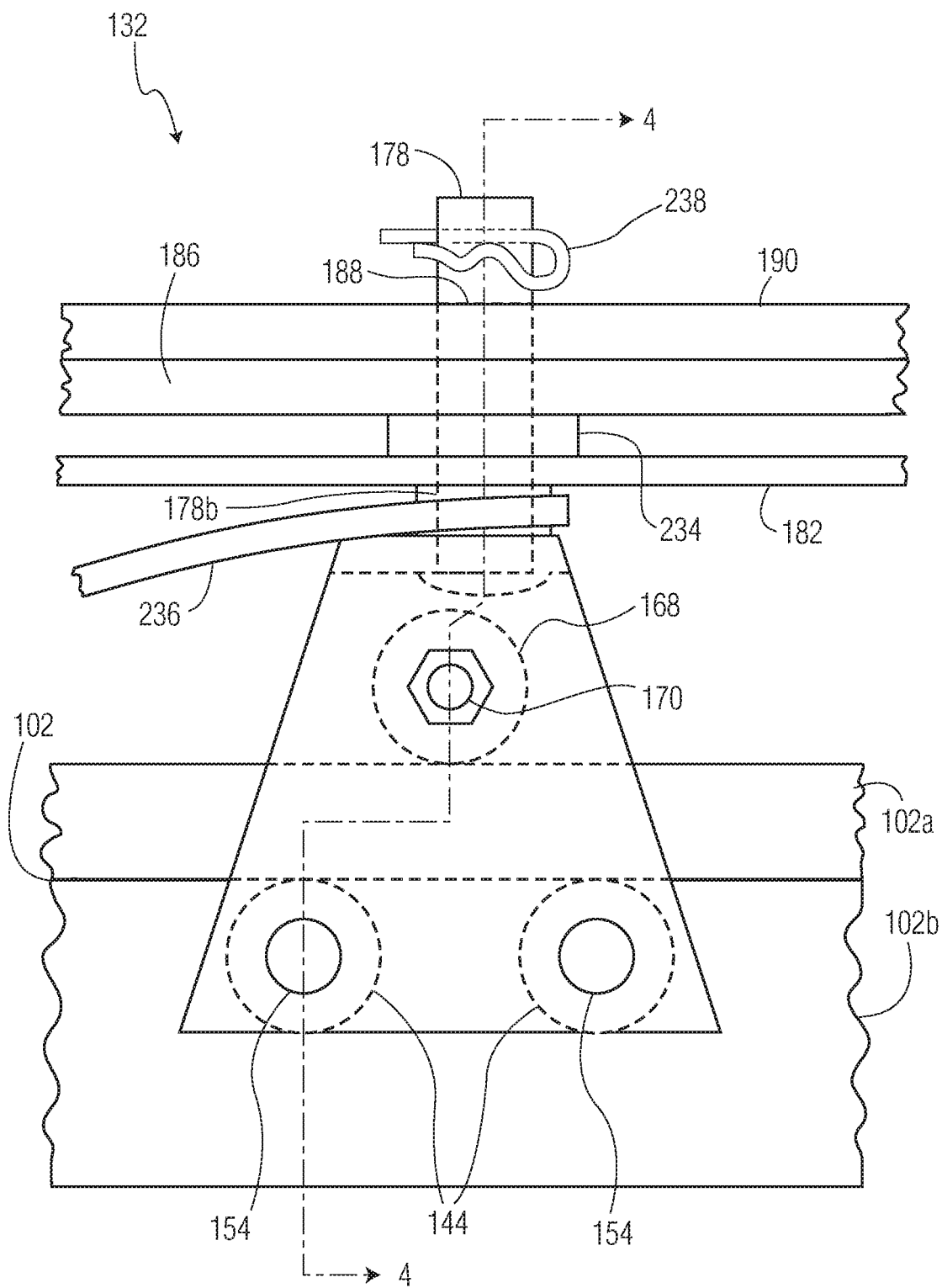
FIG. 3 illustrates an enlarged partial side view of an exemplary sliding pivot point assembly of an exemplary ski trainer apparatus, according to a preferred embodiment of the present invention.
Figure 4:
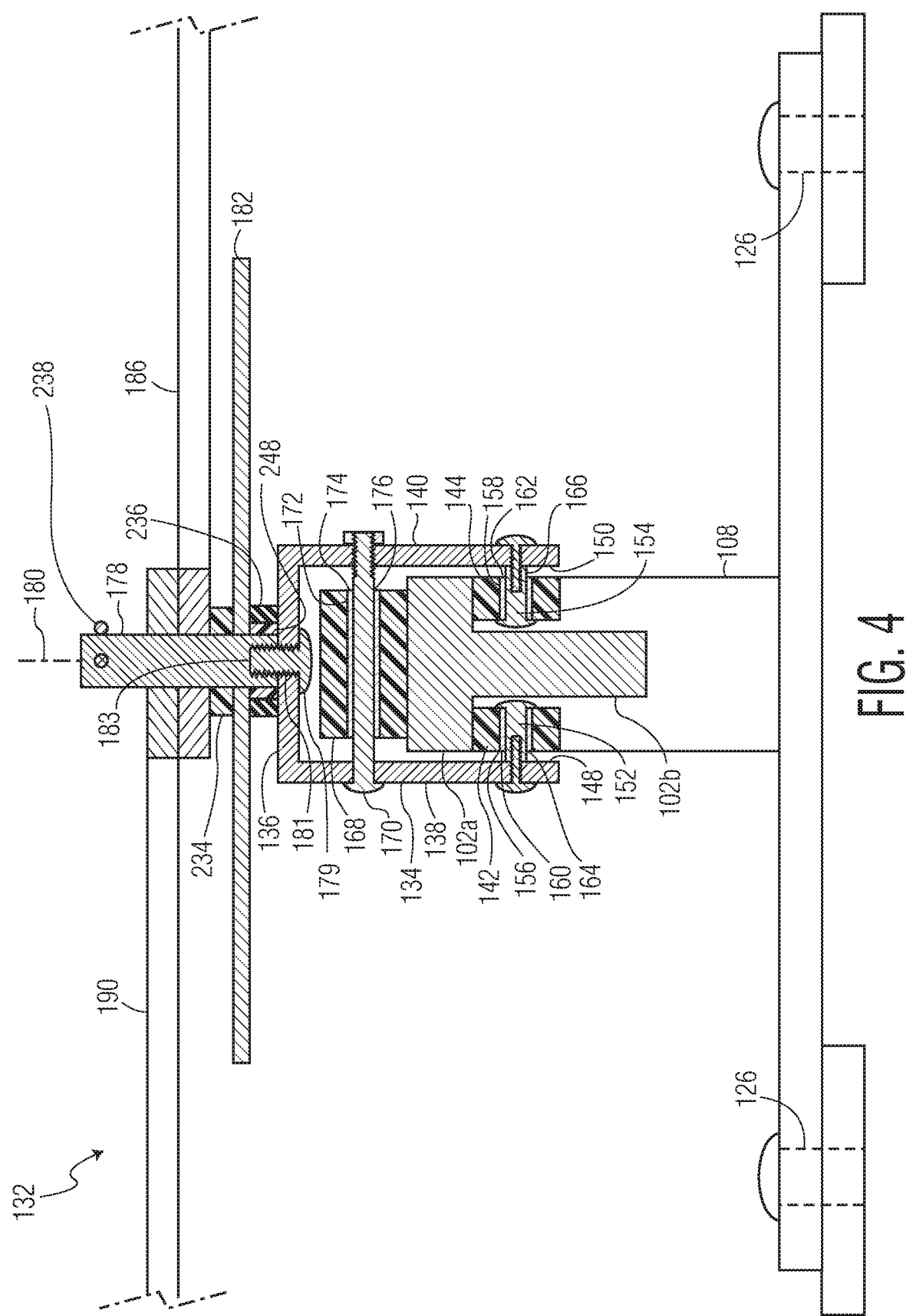
FIG. 4 is a cross sectional view along the cutting view 4-4 of FIG. 3, according to a preferred embodiment of the present invention.

As illustrated in FIGS. 1-4, the ski training apparatus 100 comprises a sliding pivot point assembly 132 operatively engaging the T-beam 102 for longitudinal movement along the length of the T-beam 102. FIGS. 2-4 illustrate that the sliding pivot point assembly 132 preferably comprises a reverse U-shaped support frame 134 having a horizontal wall 136 and downwardly extending vertical walls 138, 140 sized to closely surround the flange 102a of the T-beam 102.

As illustrated in FIG. 3 and FIG. 4, the sliding pivot point assembly 132 comprises an in line pair of roller wheels 142, 144 engaging the bottom surface of the flange 102a of the T-beam on each side 142, 144 of the web 102b of the T-beam 102 for longitudinal movement (illustrated by arrow 146 in FIG. 1) along the length of the T-beam 102. Each pair of roller wheels 142, 144 is operatively connected to the inside surface 148, 150 of one of the respective vertical walls 138, 140 of the support frame 134. FIG. 4 shows that each roller wheel of the in line pair of roller wheels 142, 144 is mounted rotating free on a spindle 152, 154 fixed to the respective vertical wall 138, 140 of the support frame 134. In a preferred embodiment, each roller wheel of the in line pair of roller wheels 142, 144 further comprises a cylindrical inner surface 156, 158 and a cylindrical bearing 160, 162 tightly fitted within the respective cylindrical inner surface 156, 158, as illustrated in FIG. 4, and each cylindrical bearing 160, 162 has a cylindrical inner working 164, 166 which is freely spinnable within the respective bearing 160, 162. Each cylindrical bearing 160, 162 and inner working 164, 166 is concentrically aligned with and sized to closely and securely surround the respective spindle 152, 154 which is fixed to the respective vertical wall 138, 140 of the support frame 134, allowing the in line pairs of roller wheels 142, 144 to freely rotate in a substantially frictionless manner.

As further illustrated in FIG. 3 and FIG. 4, the sliding pivot point assembly 132 further comprises at top roller wheel 168 engaging the top surface of the flange 102a of the T-beam 102 for longitudinal movement (illustrated by arrow 146 in FIG. 1) along the length of the T-beam 102. The top roller wheel 168 is mounted rotating free on a top spindle 170 fixed between the vertical walls 138, 140 of the support frame 134. In a preferred embodiment, the top roller wheel 168 further comprises a cylindrical inner surface 172 and a cylindrical bearing 174 tightly fitted within the cylindrical inner surface 172, as illustrated in FIG. 4, and the cylindrical bearing 174 has a cylindrical inner working 176 which is freely spinnable within the bearing 174. The cylindrical bearing 174 and inner working 176 is concentrically aligned with and sized to closely and securely surround the top spindle 170 which is fixed between the vertical walls 138, 140 of the support frame 134, to freely pivot in a substantially frictionless manner.

As further illustrated in FIG. 3 and FIG. 4, the sliding pivot point assembly 132 further comprises a vertically extending cylindrical pivot point shaft 178 fixed atop the horizontal wall 136 of the support frame 134 providing a single pivot point vertical axis 180 that is capable of longitudinal movement (illustrated by arrow 146 in FIG. 1) along the longitudinal axis of the T-beam 102.

In one embodiment, the cylindrical pivot point shaft 178 and reverse U-shaped support frame 134 are constructed as one member. In an alternative embodiment, the cylindrical pivot point shaft 178 is welded to the reverse U-shaped support frame 134. In a preferred embodiment, the lower section 178b of the cylindrical pivot point shaft 178 is connected to the reverse U-shaped support frame 134 by fasteners such as a threaded bolt 179 extending through an orifice 181 of the frame 134 and into an inner threaded portion 183 of the bottom tip of the lower section 178b of the cylindrical pivot point shaft 178 as illustrated in FIG. 4.

Preferably, the bottom tip of the lower section 106b of the cylindrical shaft 106 is preferably welded to the frame 104, as illustrated in FIG. 2 and FIG. 3. In an alternative embodiment, the bottom tip of the lower section 106b of the cylindrical shaft 106 may be connected to the frame 104 by fasteners such as a threaded bolt 116 extending through a washer 116a and an orifice 118 of the frame 104 and into an inner threaded portion of the bottom tip 115 of the lower section 106b of the cylindrical shaft 106 as illustrated in FIG. 2, whereby the exterior diameter of the cylindrical shaft 106 exceeds the diameter of the orifice 118 such that the cylindrical shaft 106 is fixed atop the frame 104 and yet secured by the threaded bolt 116.

As further illustrated in FIG. 3 and FIG. 4, preferably, the cylindrical pivot point shaft 178 has an upper section 178a opposite a lower section 178b, and the lower section 178b has an achievement disc 182 connected to it.

Figure 5:
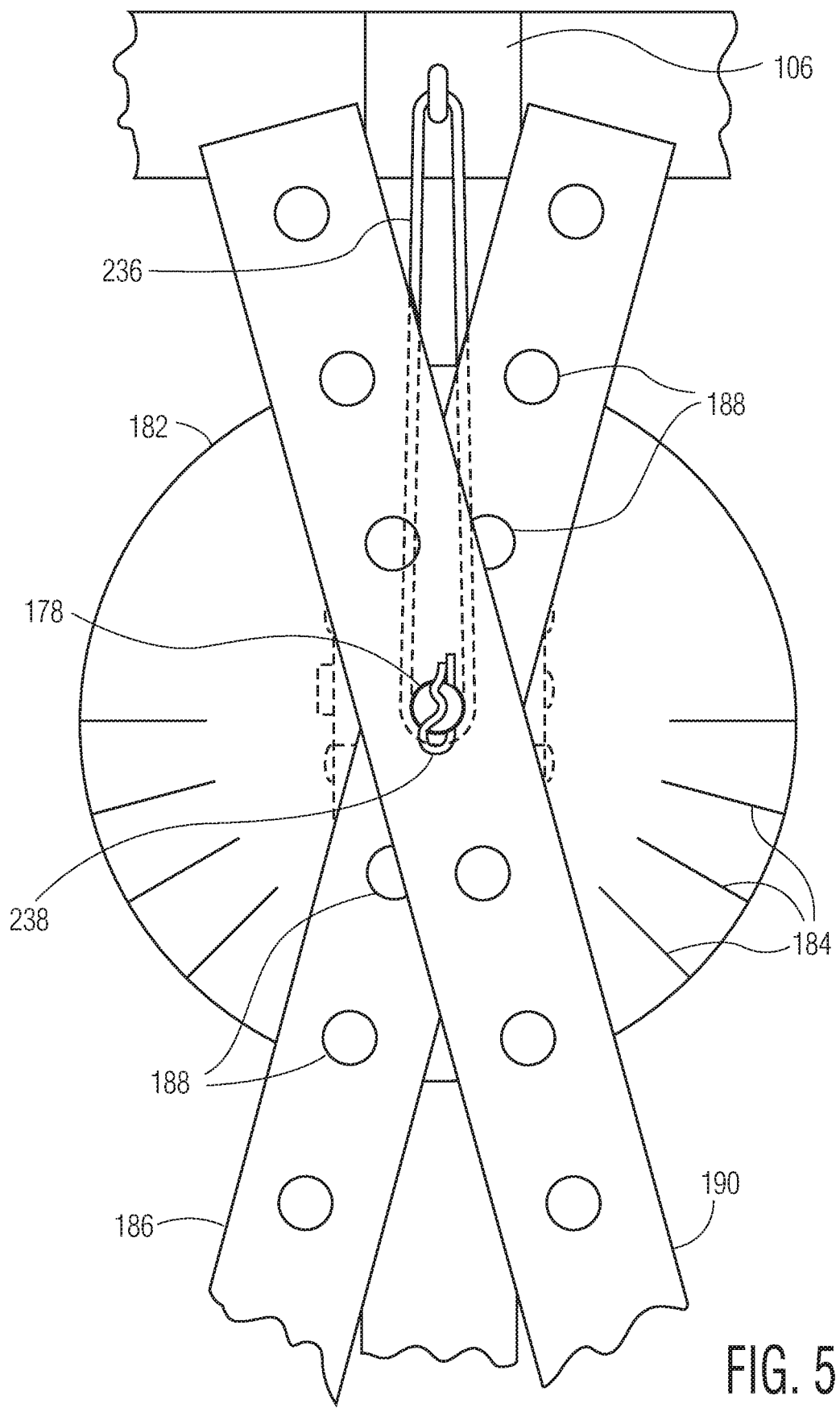
FIG. 5 illustrates an enlarged partial top view of an exemplary sliding pivot point assembly of an exemplary ski trainer apparatus, according to a preferred embodiment of the present invention.

The achievement disk 182 is aligned concentric with and is sized to closely and securely surround the lower section 178b of the cylindrical pivot point shaft 178. As illustrated in FIG. 5, the achievement disk 182 has a plurality of markings 184 inscribed thereon, and those markings 184 extend out radially from the point at which the achievement disc 182 intersects perpendicularly with the cylindrical pivot point shaft 178 to the outer perimeter of the achievement disc 182 for correlation between angles achieved in operation of the apparatus 100 with varying degrees of difficulty of downhill turns in assimilation of parallel snow skiing.

As illustrated in FIG. 1, the snow ski training apparatus 100 further comprises an elongated first ski arm 186 having a front end 186a opposite a tail end 186b. The first ski arm 186 is configured to pivotally mount onto the cylindrical pivot point shaft 178 by said shaft 178 vertically extending through a selected one of a plurality of holes 188 spaced along the axial length (defining longitudinal axis L1) of the first ski arm 186, allowing the first ski arm 186 to freely pivot independently around the vertical axis 180 of the cylindrical pivot point shaft 178.

As illustrated in FIG. 1, the snow ski training apparatus 100 further comprises an elongated second ski arm 190 disposed unparallel to the first ski arm 186 having a front end 190a opposite a tail end 190b. The second ski arm 190 is configured to pivotally mount onto the cylindrical pivot point shaft 178 by said shaft 178 vertically extending through a selected one of a plurality of holes 192 spaced along the axial length (defining longitudinal axis L2) of the second ski arm 190, allowing the second ski arm 190 to freely pivot independently around the same vertical axis 180 of the cylindrical pivot point shaft 178 as the first ski arm 186.

FIG. 3 illustrates that a cotter pin 238 is preferably configured through the top section 178a of the cylindrical pivot point shaft 178, so as to provide resistance against unintended uplift and resulting removal of the ski arms 186, 190 from the cylindrical pivot point shaft 178.

As illustrated in FIGS. 1-2 and FIGS. 6-20, the snow ski training apparatus 100 comprises a first foot pad 194 selectively connected to the tail end 186b of the first ski arm 186, and the snow ski training apparatus 100 further comprises a second foot pad 196 selectively connected to the tail end 190b of the second ski arm 190. The first foot pad 194 is configured to receive a first foot 198 of a user, and the second foot pad 196 is configured to receive a second foot 199 of a user, as illustrated in FIG. 2, FIG. 6, and FIGS. 13-20.

As illustrated in FIG. 1, the elongated ski arms 186, 190 are not parallel. One reason that the ski arms 186, 190 are not parallel is because such embodiment of the present invention enables longitudinal axes L1, L2 of the ski arms 186, 190 to cross and overlap at a single pivot point 178, and thereby enables the foot pads 194, 196 to rotate about the same pivot point axis 180, and thus enables the foot pads 194, 196 of the ski training apparatus 100 to rotate along the same, congruent and overlapping arc 200. In teaching and training a user in the art of parallel snow skiing, embodiments of the present invention more closely represent actual snow skiing.

Figure 11:
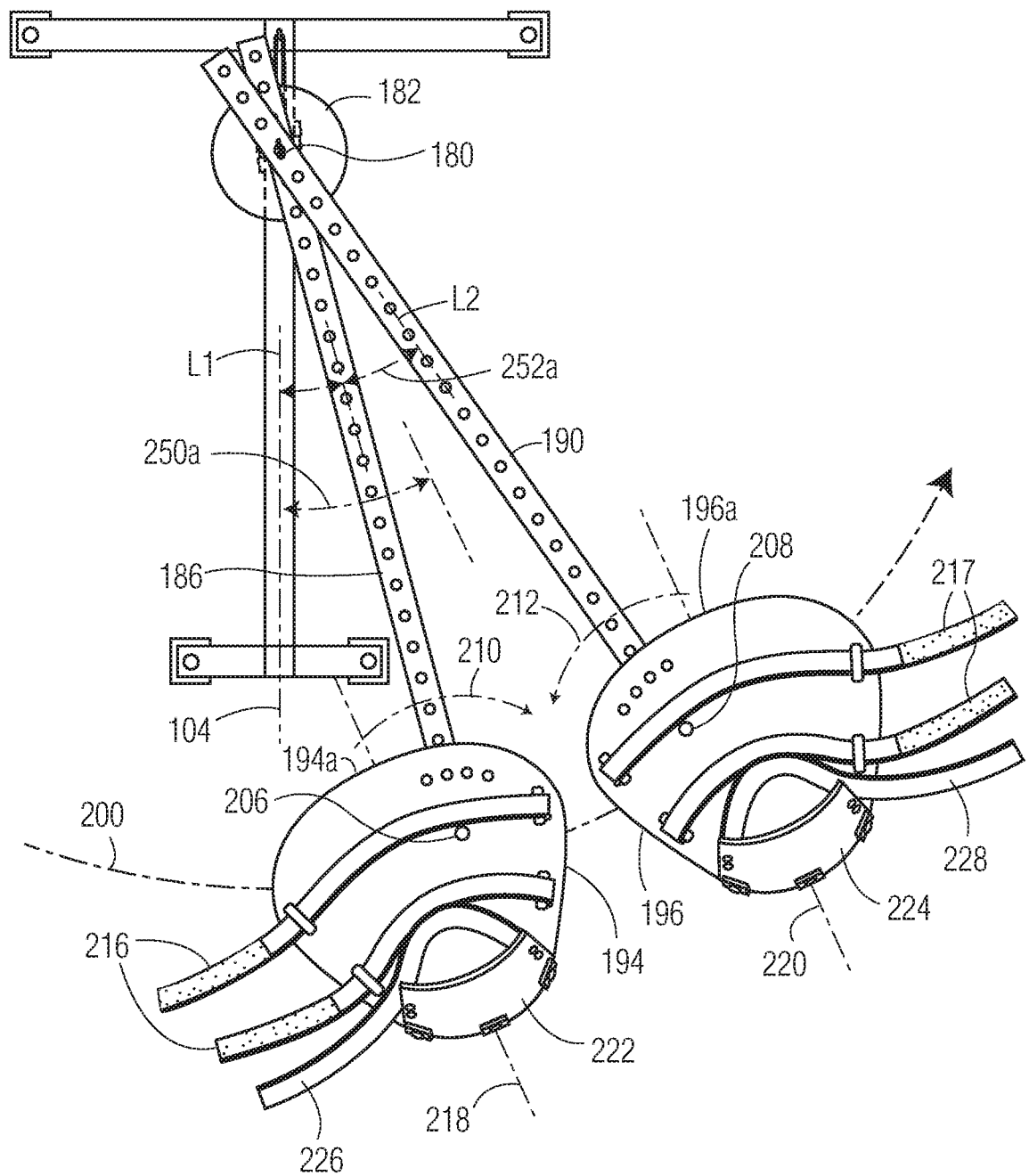
FIG. 11 illustrates a top view of an exemplary ski training apparatus, according to a preferred embodiment of the present invention.

In a preferred embodiment, there is an array of spaced apart positioning holes 202, 204 arranged along on the toe end 194a, 196a of each of the foot pads 194, 196 selectively in line with a corresponding mounting hole 206, 208 disposed within each respective foot pad 194, 196 in a manner such that each foot pad 194, 196 may be selectively mounted to the respective ski arm 186, 190 at any selected position along the same arc 210, 212, respective to each foot pad 194, 196, as illustrated in FIG. 11.

Figure 7:
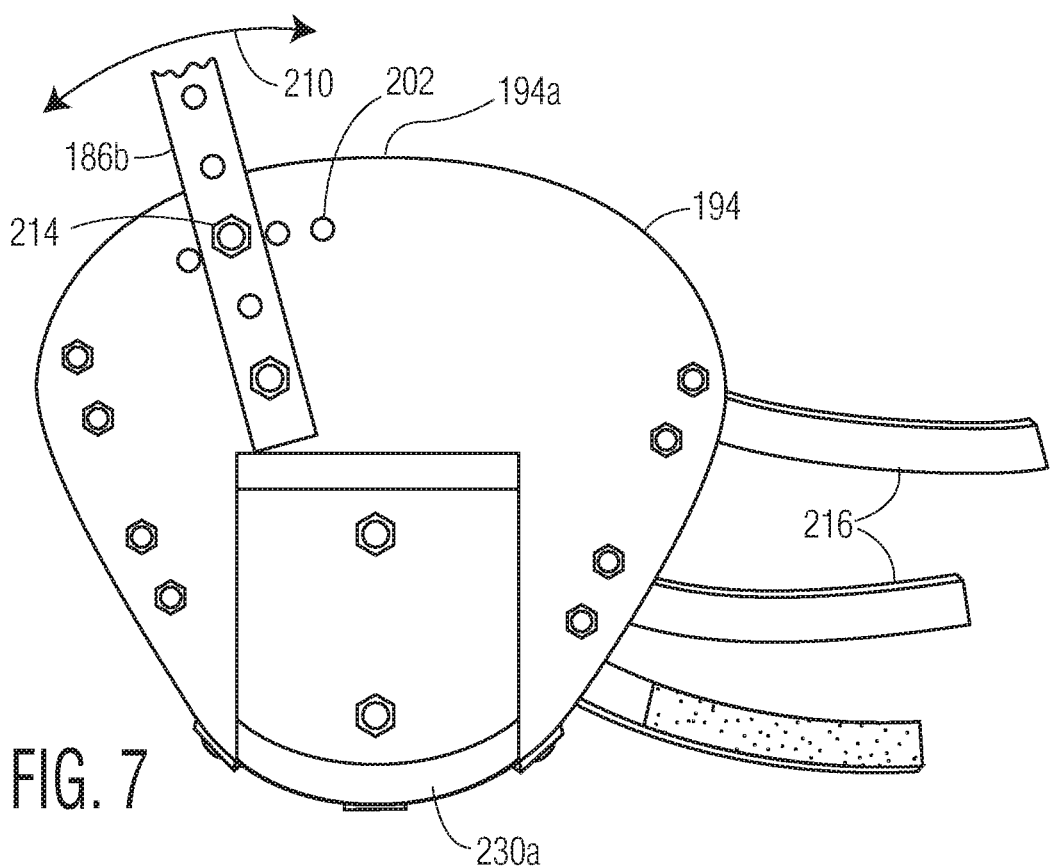
FIG. 7 illustrates a bottom view of an exemplary foot pad connected to a tail end of a ski arm and connected to an exemplary landing base pad, according to a preferred embodiment of the present invention.
Figure 8:
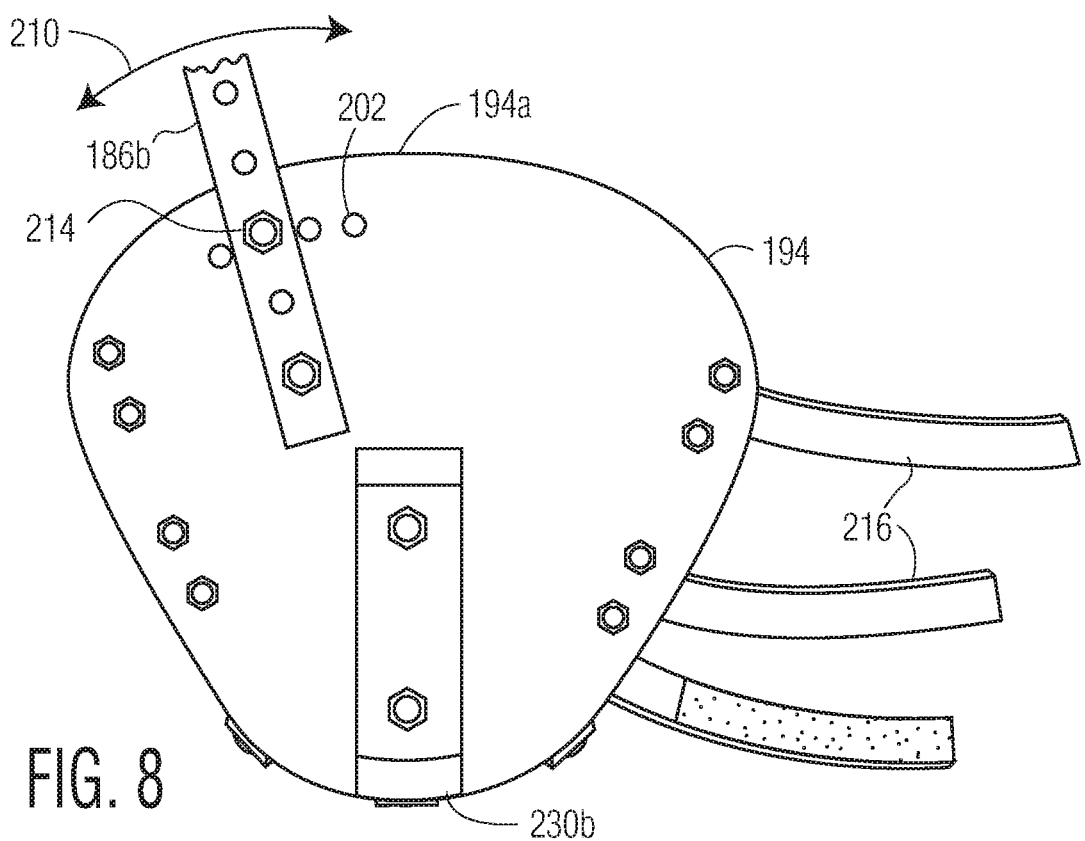
FIG. 8 illustrates a bottom view of an exemplary foot pad connected to a tail end of a ski arm and connected to another exemplary landing base pad, according to a preferred embodiment of the present invention.

As illustrated in FIGS. 7-8, the selected connection for the first foot pad 194 is a fixed position with respect to the first ski arm 186, configured by a bolt 214 vertically extending through at least one of the holes 188 disposed at the tail end 186b of the first ski arm 186 and vertically extending into a selected one of a plurality of holes 202 disposed within the first foot pad 194, where such holes 202 are configured to receive the bolt 214 so as to connect and position the foot pad 194 relative to the tail end 186b of the ski arm 186.

Figure 6:
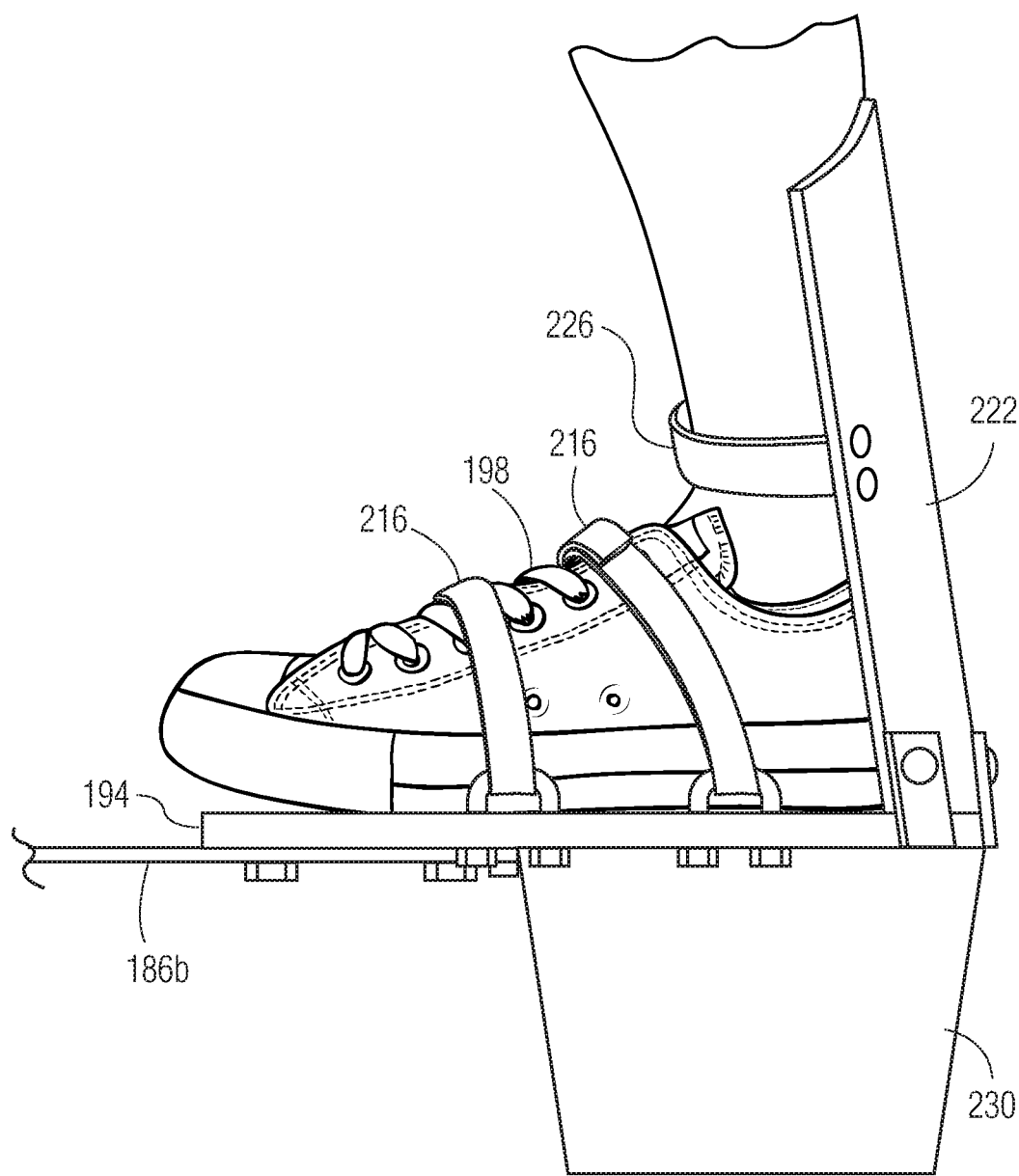
FIG. 6 illustrates an enlarged partial side view of an exemplary foot of a user engaged with a foot pad of a ski training apparatus, according to a preferred embodiment of the present invention.
Figure 9:
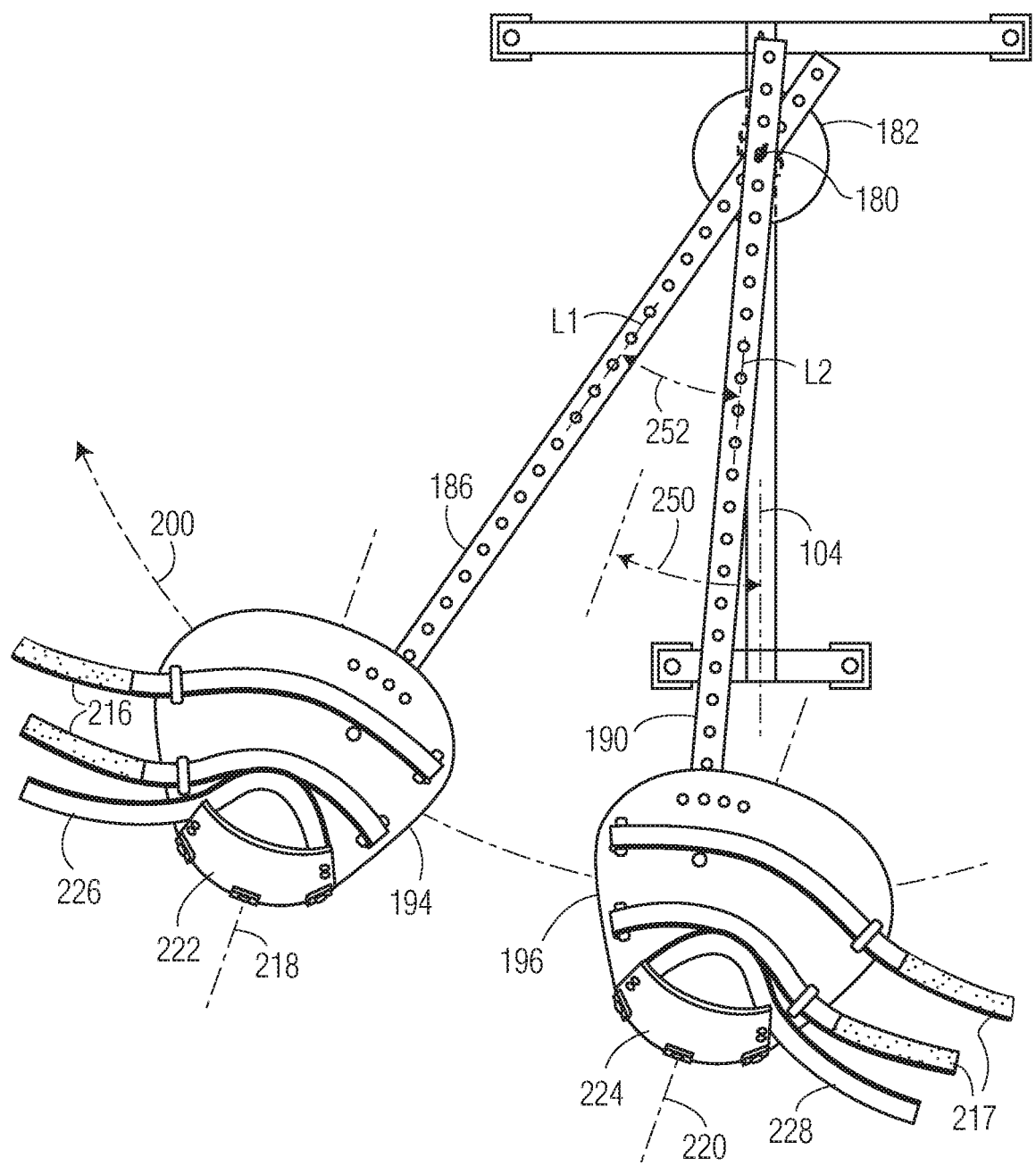
FIG. 9 illustrates a top view of an exemplary ski training apparatus, according to a preferred embodiment of the present invention.

As illustrated in FIG. 6 and FIG. 9, in a preferred embodiment, each of the foot pads 194, 196 has laces 216, 217 mounted to the respective foot pad 194, 196 in a spaced apart relationship on opposite sides of the longitudinal axis 218, 220 of the respective foot pad 194, 196. The laces 216, 217 are configured to hold the two feet 198, 199 of the associated user of the exercise apparatus 100 in a substantially fixed relationship relative to the respective foot pad 194, 196 when using the ski training apparatus 100.

Some previous ski inventions require multiple pivot points including a pivot point directly under the center of the foot requiring expensive complexities of construction and others have two foot pedals directly connected, allowing for no independent action. Embodiments of the present invention have more improved duplication of actual snow skiing and are improvements over previous devices because the true pivot point for turning is established at a single pivot point 180 embodiment for both pivoting ski arms 186, 190 operating independently and because the single pivot point 180 embodiment longitudinally moves backward and forward enabling the user's body and feet to actually move backward and forward through the user's frontal (or coronal) plane, while also radially guiding and maintaining both of the user's feet within the same overlapping arc 200.

In one embodiment, the two ski arms 186, 190 having a single pivot point 180 forces each independently and tangentially moved foot 198, 199 of the user to remain within the same overlapping arc 200 as the other independently and tangentially moved foot 198, 199 of the user, as illustrated in FIG. 1 and FIGS. 9-11. Embodiments of the present invention provide improved techniques to closely teach and represent actual snow skiing.

Similarly to actual snow skiis, the overall length of each ski arm 186, 190 is preferably selectively sized depending on the height and weight of the user.

The pivot point assembly 178 provides a means for accommodating the tangential and radial forces exerted upon the ski training apparatus 100 by sliding back and forwards along the T-beam 102 while a user laterally jumps and rotationally pivots around the pivot point assembly 178, as illustrated in FIGS. 15-20.

Figure 13:
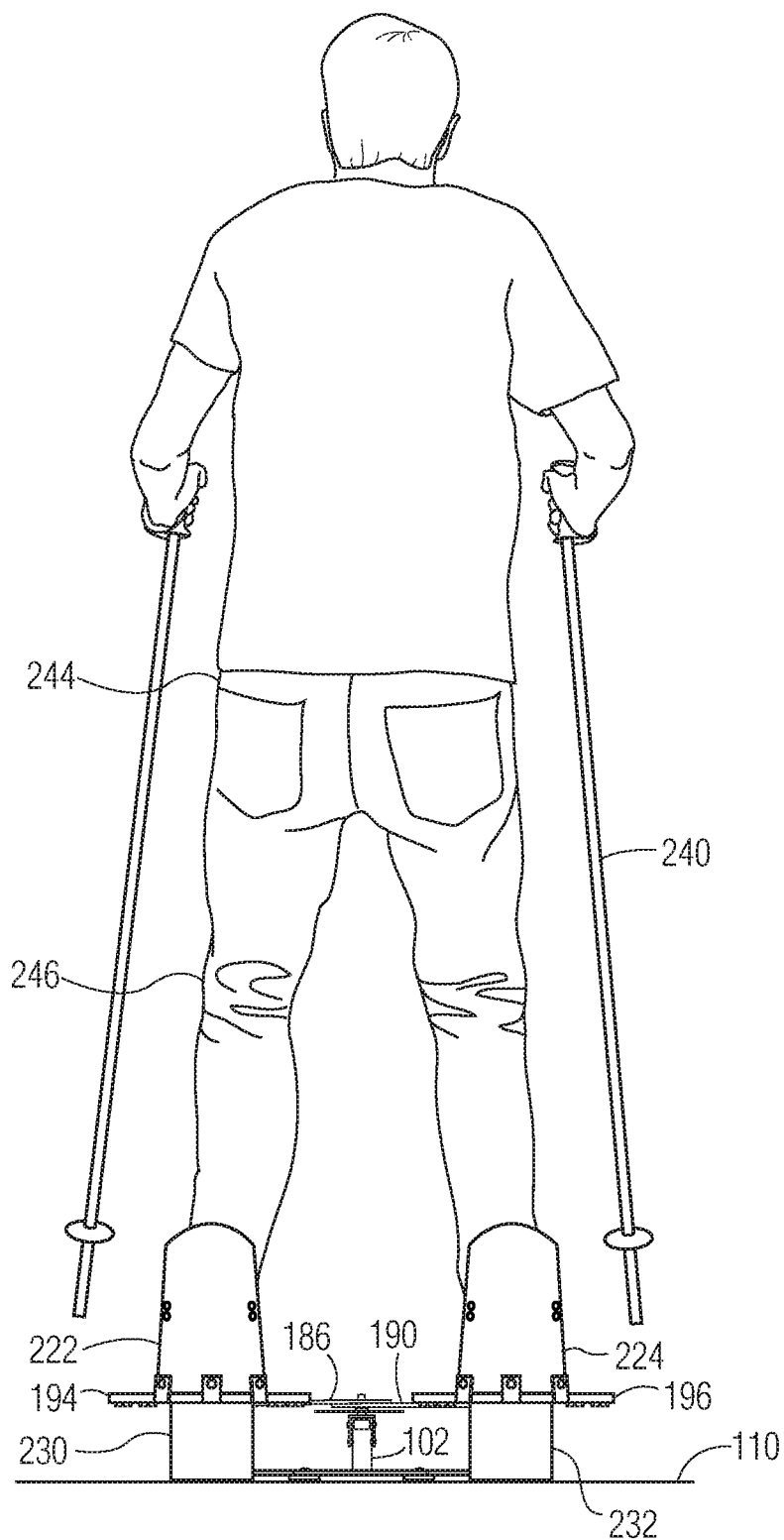
FIG. 13 illustrates a back view of an exemplary ski training apparatus, according to a preferred embodiment of the present invention, and illustrated with a user.

As illustrated in FIGS. 7, 8 and 13, in a preferred embodiment, each of the foot pads 194, 196 has landing base pads 230, 232 mounted to the respective foot pads 194, 196. FIG. 7 and FIG. 8 illustrate that the landing base pads 230, 232 are interchangeably configured at varying widths, where 230*a* in FIG. 7 illustrates an exemplary relatively wide landing base pad 230, and 230*b* in FIG. 8 illustrates an exemplary relatively narrow landing base pad 230.

The bottom surface of the landing base pads 230, 232 is a flat substantially planar surface configured to rest stably on an associated ground 110. The toe end and heel end of the landing base pads 230, 232 preferably arch upwardly axially in relation to the respective foot pads 194, 196 as illustrated in FIGS. 2, 6-8, and 15. In one embodiment, for the landing base pads 230, 232, rubber cushions may be used, or a flat interface of rubber or any other resilient material may be provided on the bottom surface of the landing base pads 230, 232, to help support and balance the landing base pads 230, 232 and respective foot pads 194, 196 relative to the ground during use of the ski training apparatus 100.

Preferred embodiments of the present invention provide a ski training apparatus 100 that not only isolates the movement of each ski arm 186, 190 from the respective other 186, 190 during the course of operating the apparatus 100 but also absorbs impact and shock loads that can be experienced during a person's acceleration and stopping of a user's feet, particularly in jumping. Since impact and shock loads can be experienced during landings due to gravity as, for example, the user jumps from side to side, the landing base pads 230, 232 help absorb and dampen the loads and thus soften the operation for the user. The ski training apparatus 100 of embodiments of the invention is preferably created by its combining flexible ski arms 186, 190, connected to a single frontal sliding pivot connection 180, with flexible rubber shock absorber base pads 230, 232 in an assembly resulting in a single apparatus 100 that has relative rigidity for teaching guided jumping but is also flexible and compliant to absorb impacts.

FIGS. 1-4, 11 and 12 illustrate that an elastic band 236 is securely laced around the lower section 178*b* (in FIG. 3.) of the cylindrical pivot point shaft 178.

In one embodiment, one end of the elastic band 236 is connected to the eye-bolt 107 positioned atop the front column 106. The other end of the elastic band 236 is securely laced around the cylindrical pivot point shaft 178. The elastic band 236 repositions the sliding pivot point assembly 132 during training and operation of the ski training apparatus 100 by the user.

In a preferred embodiment, the other end of the elastic band 236 is securely laced around an encasing which surrounds the cylindrical pivot point shaft 178, preferably such encasing being a compression bushing 248 (FIG. 4) that is positioned concentric with and closely surrounds the lower section 178*b* (FIG. 3) of the cylindrical pivot point shaft 178 near the base 178*b* of the shaft 178. Such bushing 248 (FIG. 4) would reduce wear and tear of the elastic band 236. The bushing 248 is preferably positioned above the horizontal surface 136 of the support frame 134 and below the cylindrical performance achievement disc 182 of the sliding pivot point assembly 132 such that the elastic band 236 wrapping the bushing 236 is confined by yet freely pivotable (less side-rubbing against vertical cylindrical pivot point shaft 178) between the performance achievement disc 182 and the horizontal surface 136 of the sliding pivot point assembly 132. The bushing 248 could also serve to allowing free pivoting between the elastic band 236 and the vertical cylindrical shaft 178 while enabling suspension of the performance achievement disc 182 (in the circumstance that the performance achievement disc is not securely fastened or welded to the cylindrical pivot point shaft 178) and also obviating pinching of the elastic band 236 between the performance achievement disc 182 and the horizontal surface 136 of the sliding pivot point assembly 132, thereby greatly lessening wear and tear of the elastic band 236. Such embodiments of the present invention thereby mitigate nearly any torsional forces otherwise incidentally effected or imposed upon the cylindrical pivot point shaft 178 by the elastic band 236, further facilitating unidirectional axial forces effectuated by the elastic band 236, when a user operates the ski training apparatus 100.

Embodiments of the present invention provide for new methods for teaching and training the art of parallel snow skiing, through an embodied use of unparallel ski arms as described herein and illustrated in the Figures. Preferred methods of using the ski training apparatus embodiments of the present invention are illustrated in FIGS. 13-20. The first step of operation of the method is providing the snow ski training apparatus 100 having two elongated freely rotatable overlapping ski arms 186, 190 pivotally mounted to a single vertical cylindrical pivot point shaft 178 fixed at the point of overlap on a sliding pivotal point assembly 132. The sliding pivot point assembly 132 is configured for movement along a longitudinal axis of a supporting T-beam 102. Each ski arm 186, 190 has a foot pad 194, 196 connected to a heel rest 222, 224 resting on the ground 110 with laces 216, 217 configured on each foot pad 194, 196 and laces 226, 228 configured on each heel rest 222, 224 to receive a respective foot 198, 199 of a user at the tail end 186*b*, 190*b* of each respective ski arm 186, 190. The foot pads 194, 196 and respective feet 198, 199 of a user are preferably aligned depending on the skill level of the user. Embodiments of the present invention enable a novice user to align the foot pads 194, 196 in a slightly pigeon toed direction, analogous to the wedge technique often utilized by a novice skier during actual snow skiing. In addition, embodiments of the present invention enable an expert user to align the foot pads 194, 196 in parallel, analogous to the parallel technique often utilized by an expert skier during actual parallel snow skiing.

FIG. 13 illustrates a user standing substantially upright, supporting a substantial entirety of the user's body weight, with his left foot 198 placed atop the first foot pad 194, and his right foot placed atop the second foot pad 196. FIG. 13 illustrates the landing base pad 230, 232 secured to the bottom of each respective foot pad 194, 196, to provide additional stability and cushioning effects for the user, as a preferred embodiment. The user's feet are in alignment with the respective foot pads 194, 196 positioned on the ground. The heels of the user's feet each engage the connected heel rests 222, 224 of each respective foot pad 194, 196. Each foot 198, 199 of the user is securely laced 216, 217 to the respective foot pad 194, 196 and respective heel rest 222, 224, as illustrated in FIGS. 1, 6, 19, and 13.

Figure 14:
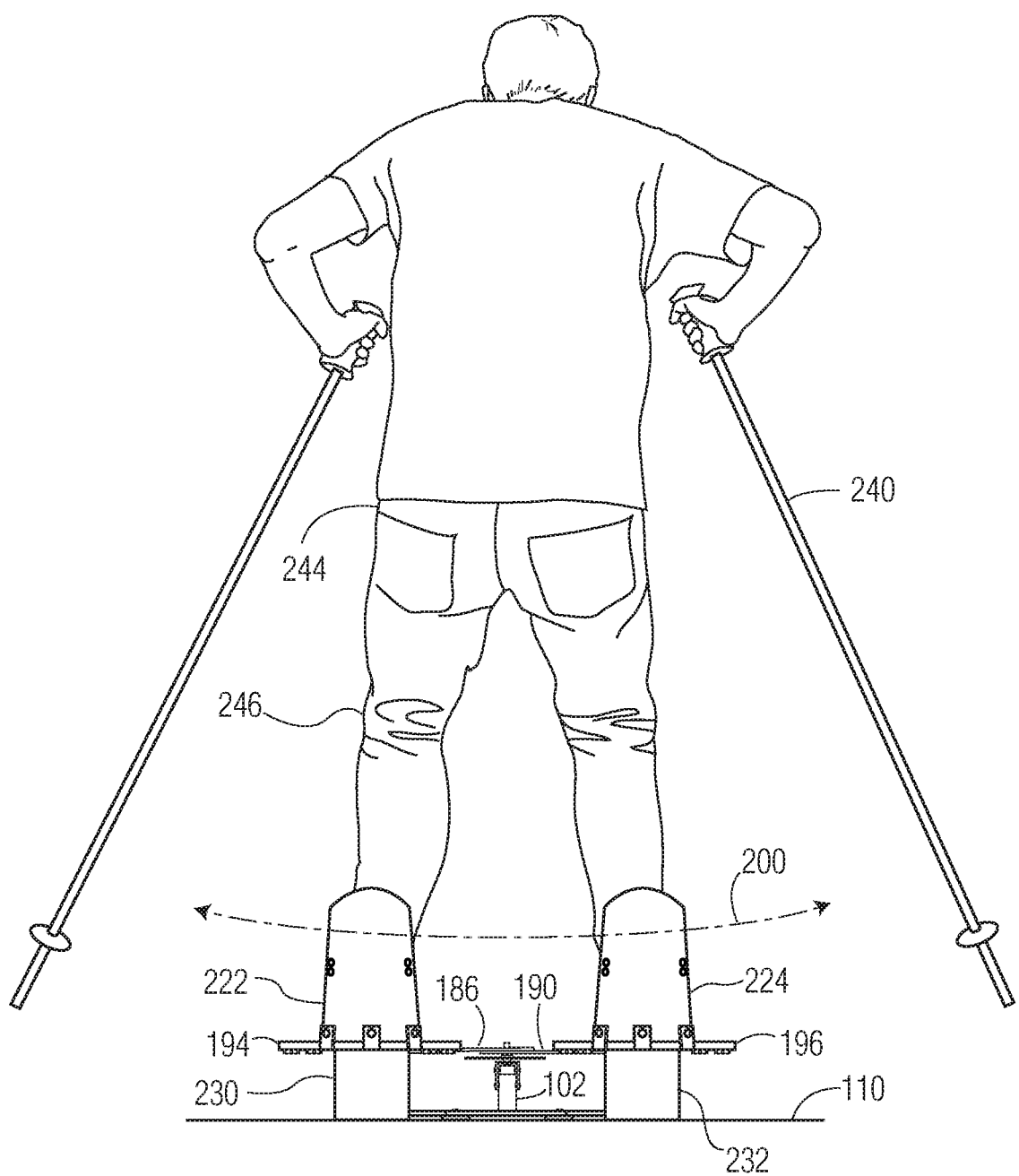
FIG. 14 illustrates a back view of an exemplary ski training apparatus, according to a preferred embodiment of the present invention, and illustrated with a user.

FIG. 14 illustrates the user of FIG. 13 assuming a hip flexed position, where the hip 244 of the user in FIG. 14 is below the height of the hip 244 of the user in the standing substantially upright position in FIG. 13. As FIG. 14 illustrates the user of FIG. 13 assuming a hip flexed position, preferably, the hip-femur 244 angle of the user approaches about 90 degrees and the bend angle of a user's knees 246 approaches about 90 degrees.

Figure 15:
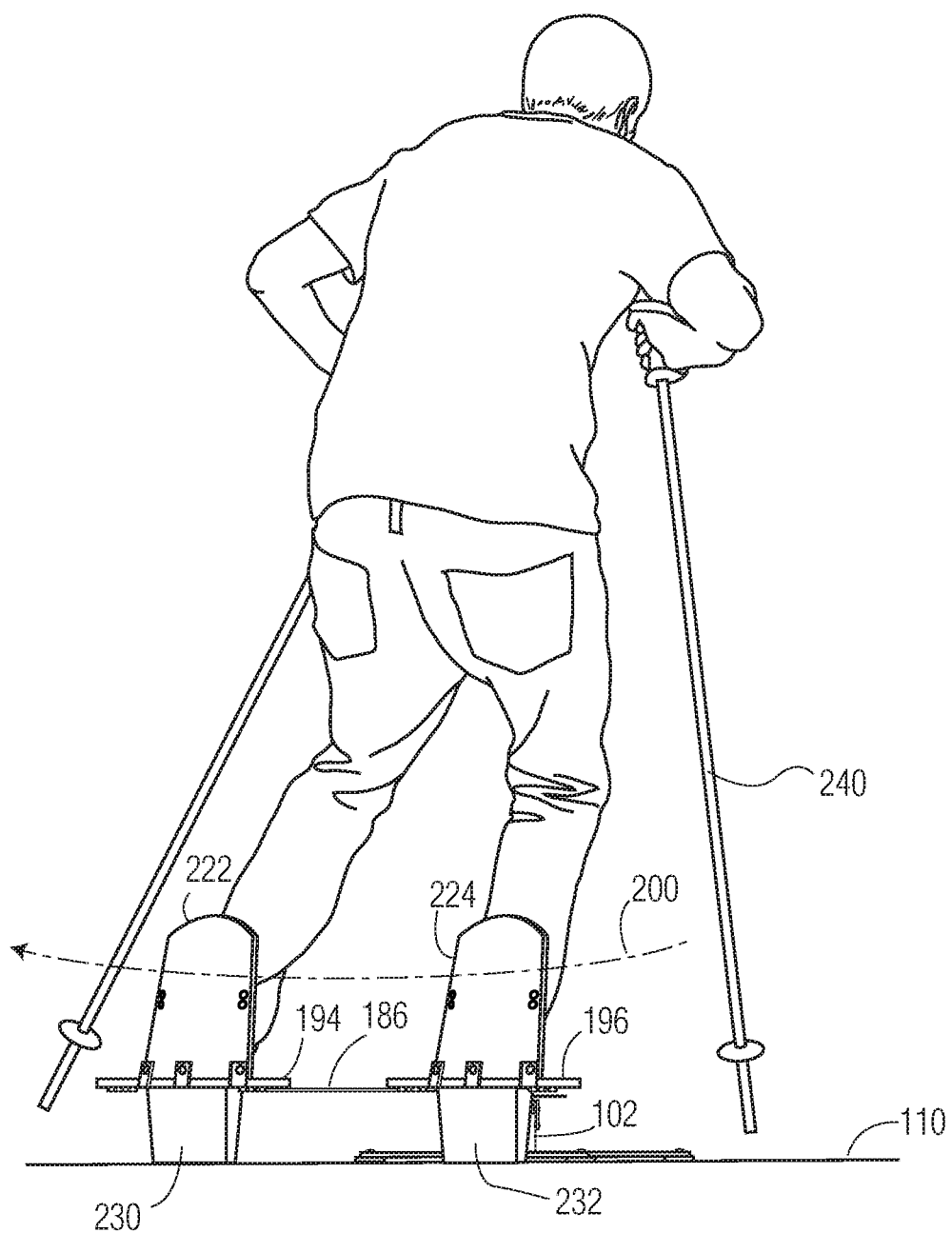
FIG. 15 illustrates a back view of an exemplary ski training apparatus, according to a preferred embodiment of the present invention, and illustrated with a user.
Figure 16:
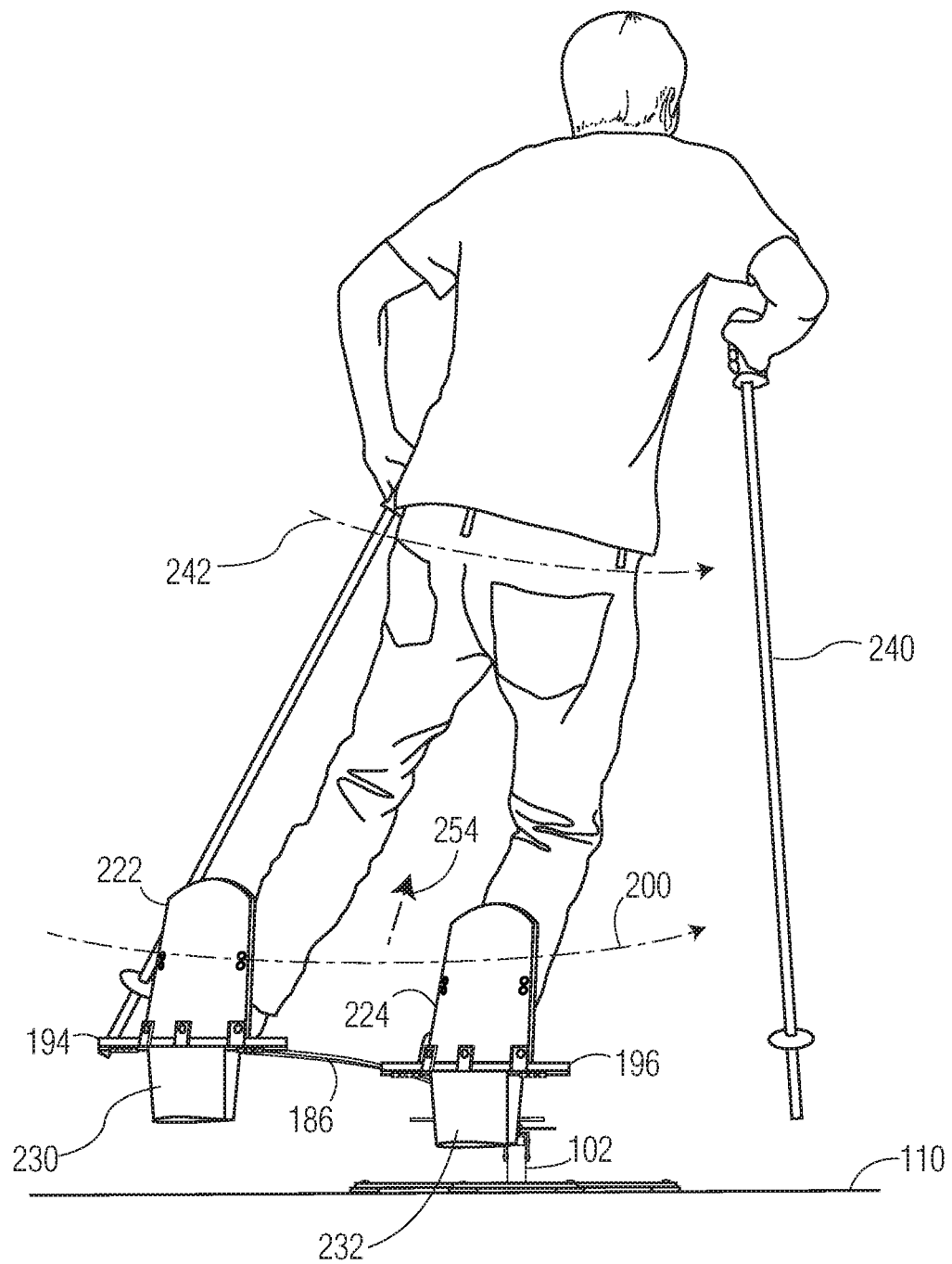
FIG. 16 illustrates a back view of an exemplary ski training apparatus, according to a preferred embodiment of the present invention, and illustrated with a user.
Figure 17:
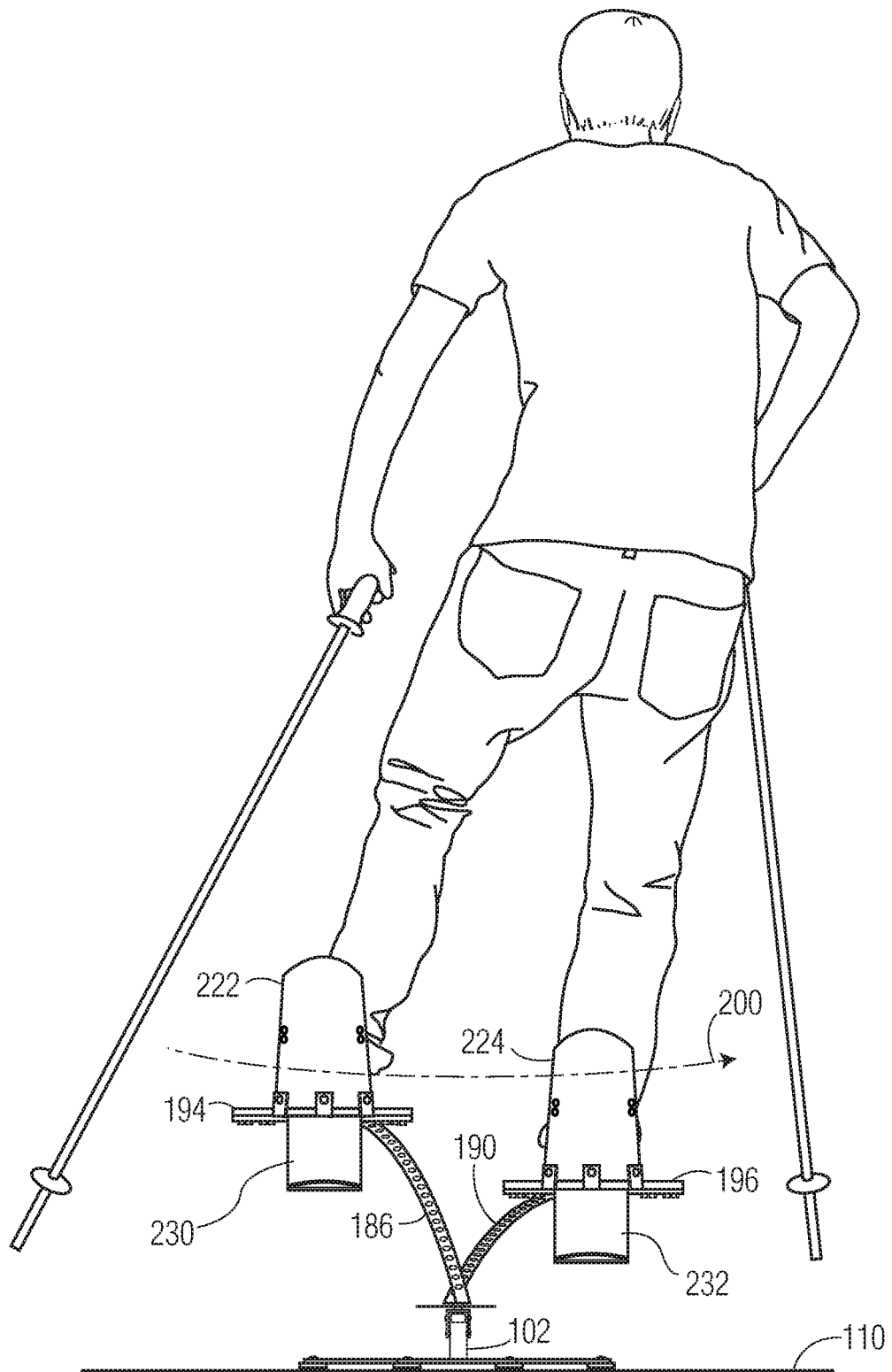
FIG. 17 illustrates a back view of an exemplary ski training apparatus, according to a preferred embodiment of the present invention, and illustrated with a user.

FIG. 15 illustrates the user leaning the user's body laterally through the user's sagittal plane. For purposes of illustration, FIG. 9 illustrates a top view of the ski arms 186, 190 rotated at approximately 30 degrees 250 off of 104, in a manner approximately similar to FIG. 15. FIG. 16 illustrates the user extending his hip 244 and knees 246 until the user achieves an elevated position (represented by arrow 254). While in the elevated position 254, the substantial entirety of the user's body weight is not being vertically supported by either foot pad 194, 196, as the foot pads 194, 196 and respective feet 198, 199 of the user are vertically free floatingly elevated 254 above the ground without load bearing support. FIG. 15 further illustrates the user rotating the user's torso as illustrated by arrow 242, as the user laterally maneuvers. FIG. 16 to FIG. 17 illustrates the user laterally maneuvering the user's body from a first position to a second position through the user's sagittal plane while in the elevated position 254. The arc arrow 200 in FIG. 17 illustrates that the foot pads 194, 196 tangentially move along the same, congruent and overlapping arc 200, according to embodiments of the present invention. In a preferred embodiment, the user's feet 198, 199 remain parallel.

FIG. 17 further illustrates that embodiments of the present invention enable the foot pads 194, 196 and user's respective feet 198, 199 to maneuver at varying and differing elevations, as the user laterally maneuvers along arc 200.

Figure 18:
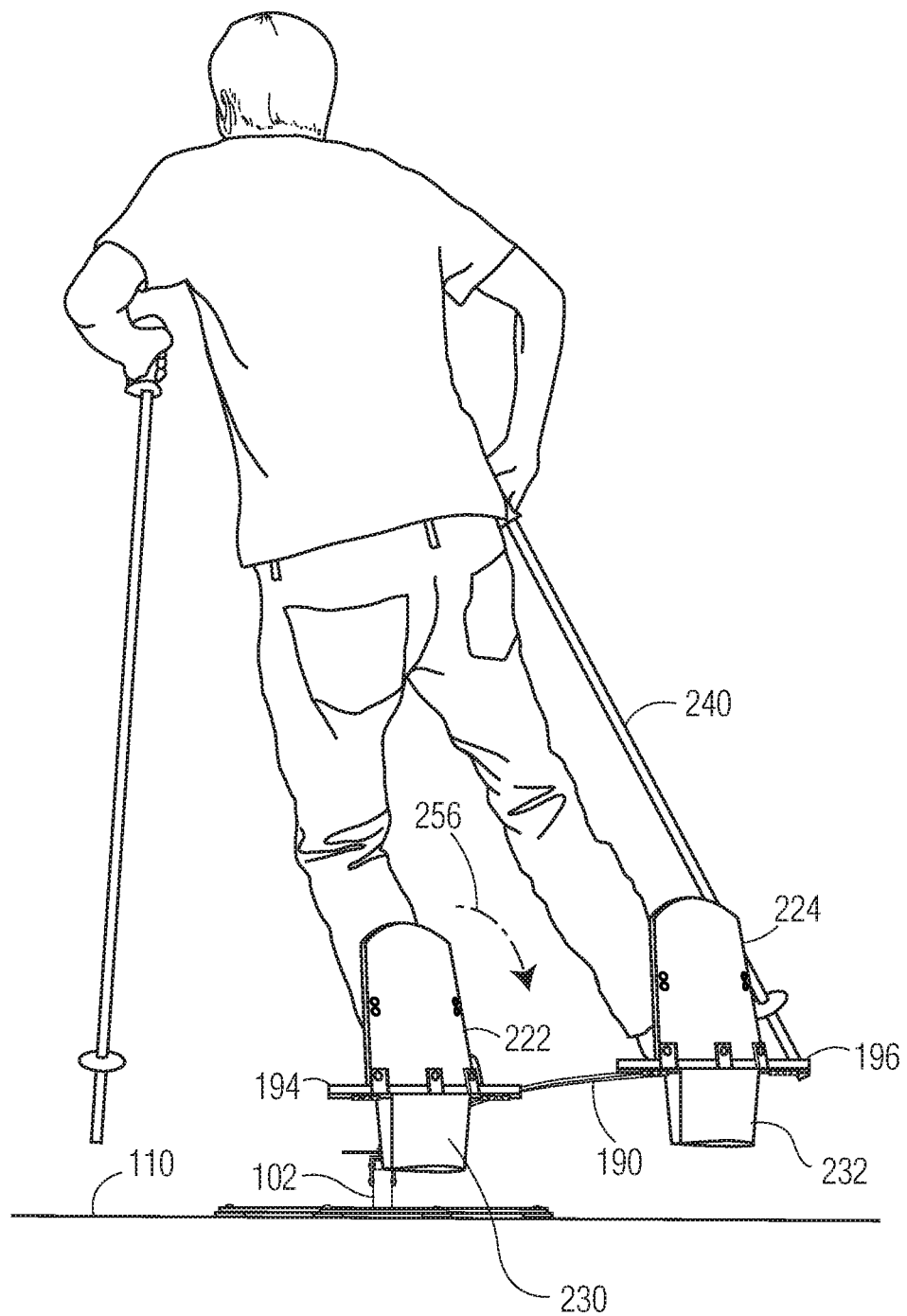
FIG. 18 illustrates a back view of an exemplary ski training apparatus, according to a preferred embodiment of the present invention, and illustrated with a user.
Figure 19:
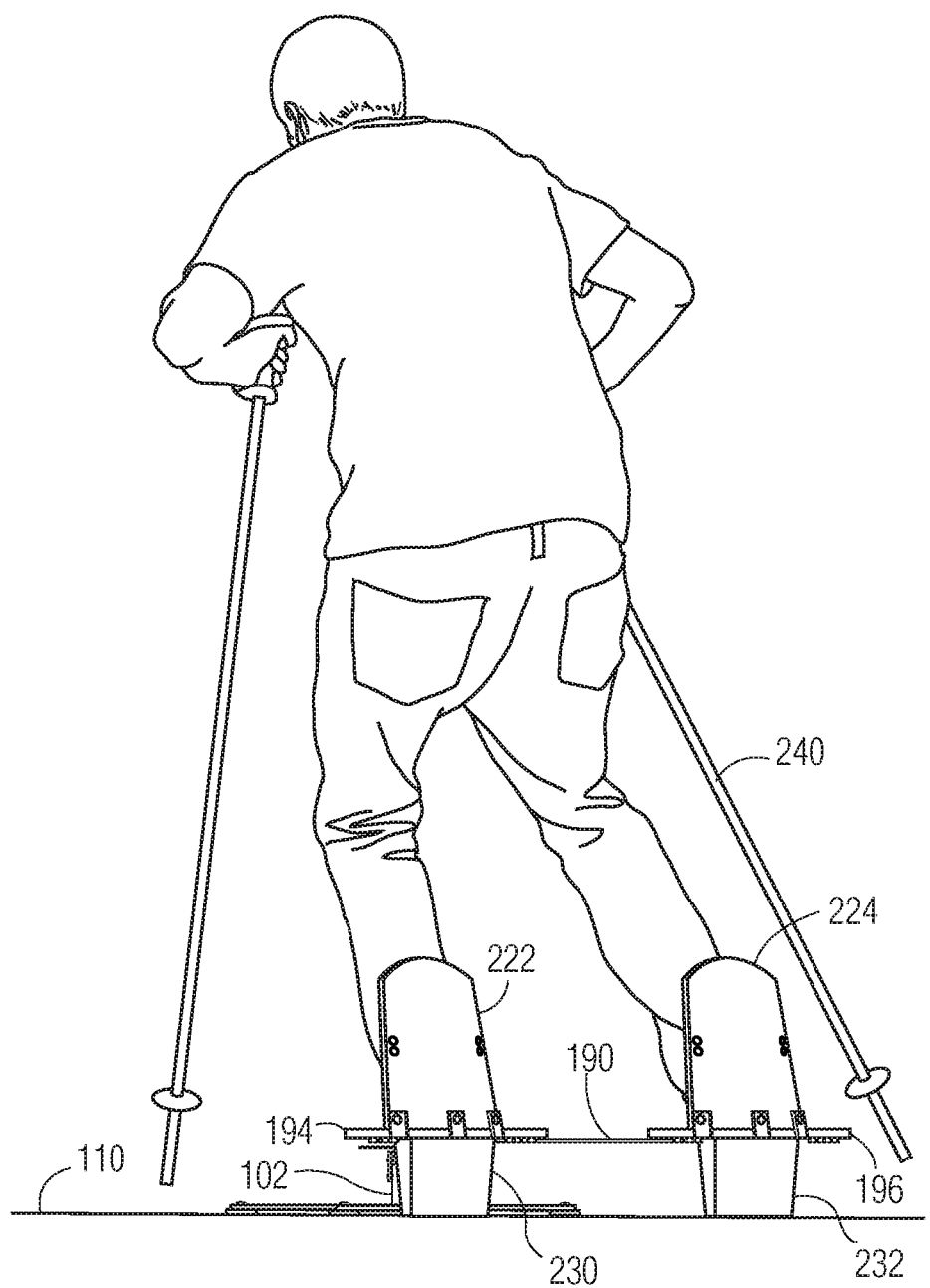
FIG. 19 illustrates a back view of an exemplary ski training apparatus, according to a preferred embodiment of the present invention, and illustrated with a user.

FIG. 18 illustrates the user descending (as illustrated by downward arrow 256) and FIG. 19 illustrates the user returning to a hip flexed position, preferably nearly opposite the initial hip flexed position illustrated in FIG. 15, after the step of laterally maneuvering the user's body. For purposes of illustration, FIG. 10 illustrates the ski arms 186, 190 rotated at approximately 30 degrees 250 off of 104, in a manner approximately similar to FIG. 19.

In a preferred embodiment of the present invention, the user initially selectively places the foot pad 194 for his/her left foot 198 substantially parallel to the foot pad 196 for his/her left foot 199 while positioned on the ground further includes aligning the right foot pad in parallel with the left foot pad, such that the longitudinal axis 218 of the foot pad 194 is parallel to the longitudinal axis 220 of the foot pad 196, as illustrated in FIG. 1 and FIGS. 9-12.

Figure 10:
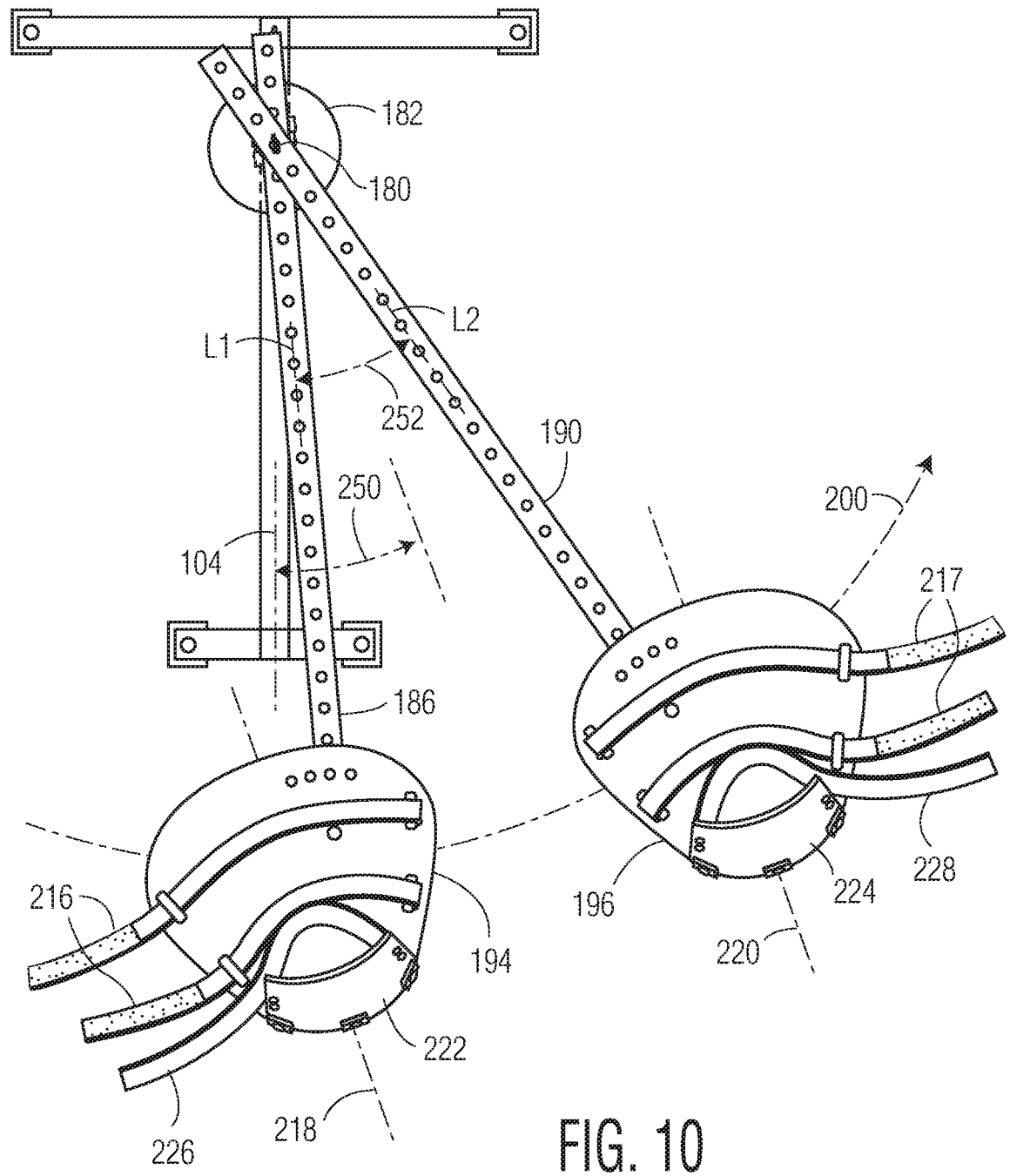
FIG. 10 illustrates a top view of an exemplary ski training apparatus, according to a preferred embodiment of the present invention.

FIG. 10 and FIG. 11 illustrate embodiments of the present invention enable the longitudinal axis 218 of foot pad 194 to be selectively positioned in parallel with the longitudinal axis 220 of foot pad 196, while the approximately 30 degree angle of arc 252 (FIG. 10) between the unparallel ski arms 186, 190 differs from the approximately 20 degree angle of arc 252a (FIG. 11) between the unparallel ski arms 186, 190.

Embodiments of the present invention further comprise a step of a user radially moving the user's body from a first position to a second position through the user's frontal plane while pivoting around the single pivot point axis 180 engaging the unparallel ski arms 186, 190 mounted on the sliding pivot point assembly 132.

Figure 12:
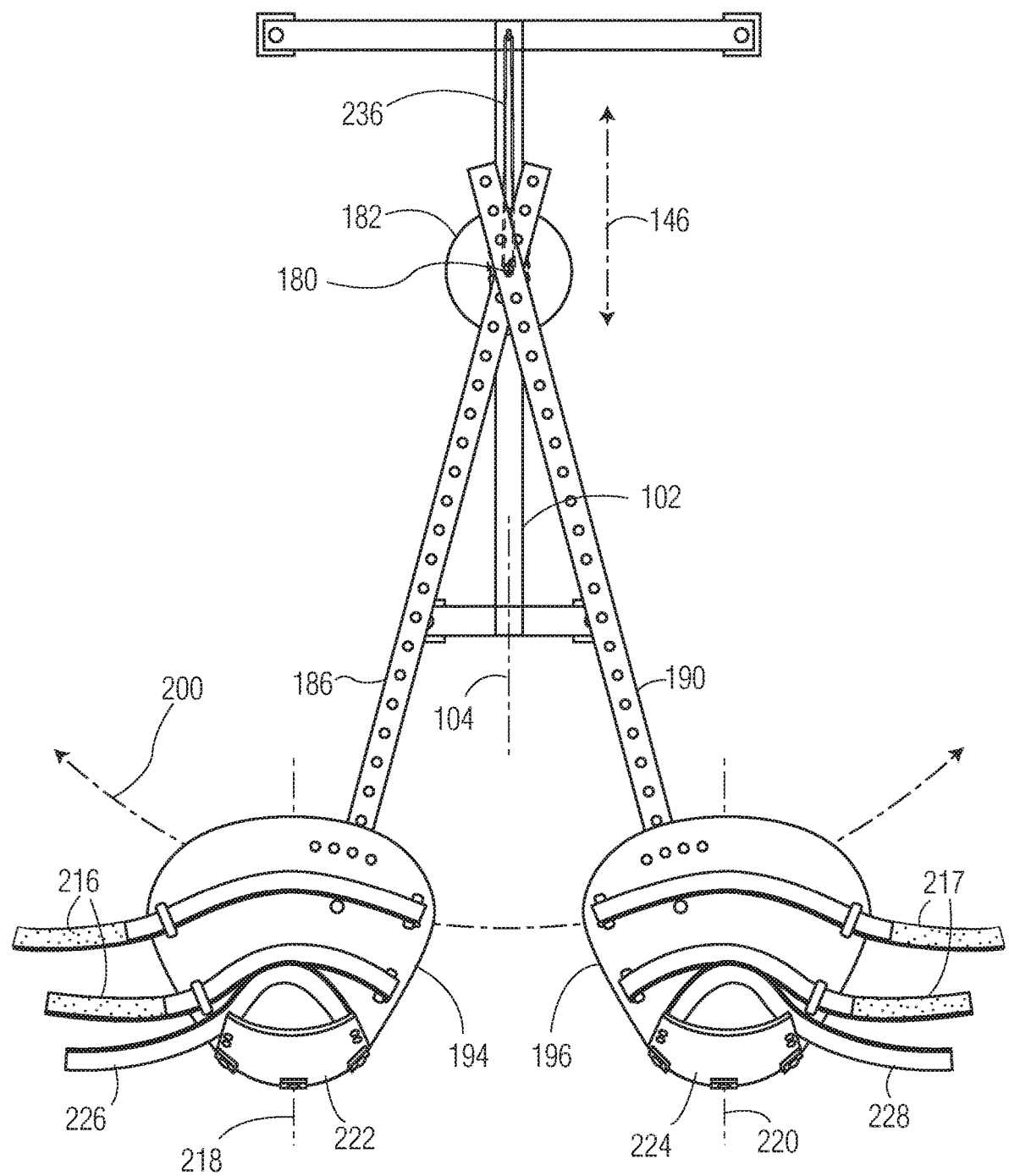
FIG. 12 illustrates a top view of an exemplary ski training apparatus, according to a preferred embodiment of the present invention.
Figure 20:
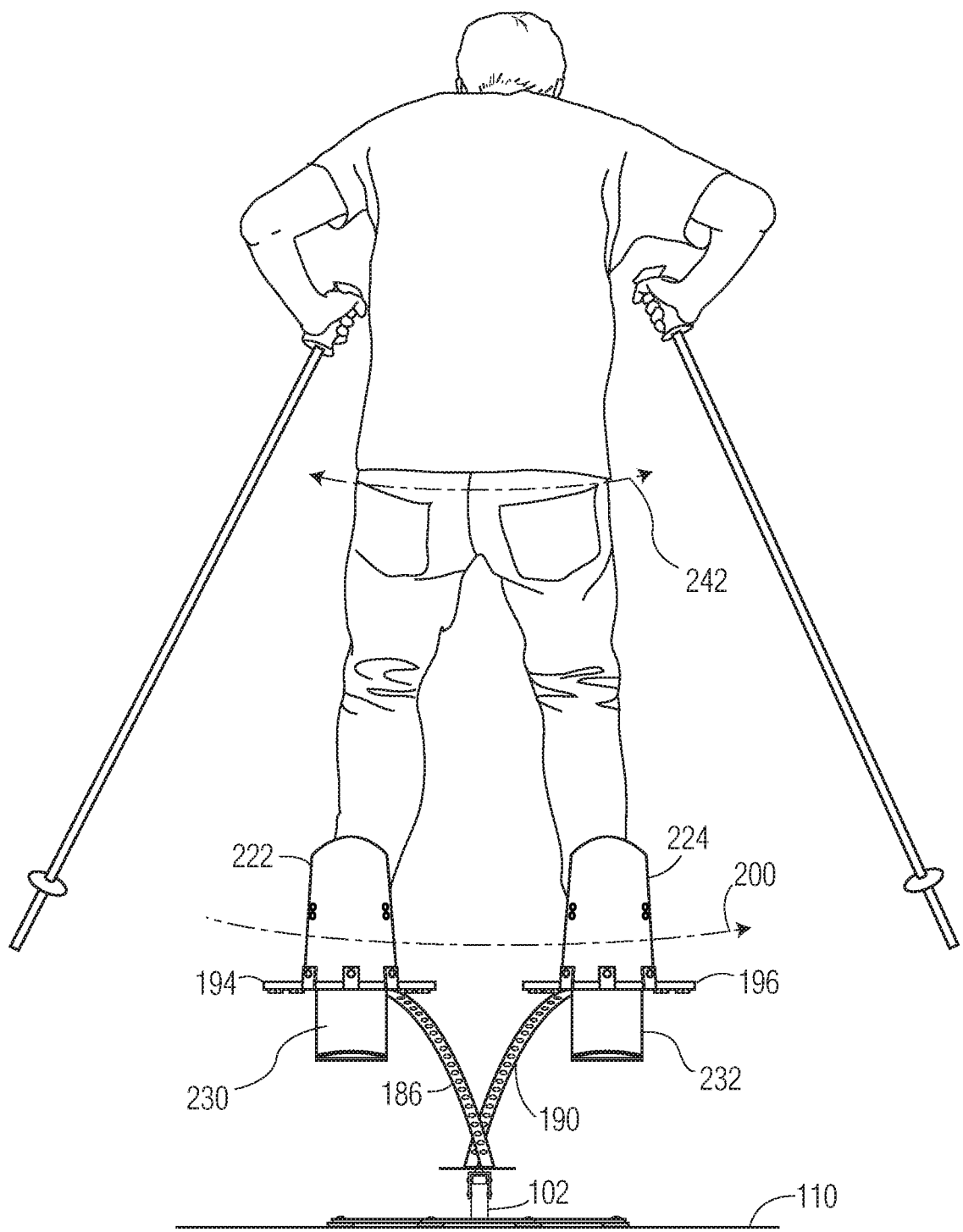
FIG. 20 illustrates a back view of an exemplary ski training apparatus, according to a preferred embodiment of the present invention, and illustrated with a user.

FIG. 12 and FIG. 20 illustrate that embodiments of the present invention enable longitudinal movement 146 of the sliding pivot point assembly 132 and respective radial movement (along 146) of a user's body, from a first position to a second position, through the user's frontal plane while laterally maneuvering and thus tangentially pivoting along arrow 242 (FIG. 20) and along arc 200 (FIG. 20) around the single pivot point 178, which engages the unparallel ski arms 186, 190 mounted on the sliding pivot point assembly 132. The elastic band 236 is illustrated in an elongated and stretched position in FIG. 12, which would be induced by radial and tangential forces exerted upon the cylindrical pivot point shaft 178 of the sliding pivot point assembly 132 by a user's laterally jumping movement through his/her sagittal plane. Embodiments of the present invention thus comprise a step of a user radially moving the user's body from a first position to a second position through the user's frontal plane while pivoting around the single pivot point 178 engaging the unparallel ski arms mounted on the sliding pivot point assembly 132.

The material, hardness, flexibility, and configuration of each ski arm 186, 190 may vary as a function of the height and weight of the user and his/her performance requirements, for example, how wide or far of a radially and axially jump a user intends to make utilizing embodiments of the present invention.

What is claimed is:

1. A method for teaching the art of parallel snow skiing using unparallel ski arms comprising:

providing a snow ski training apparatus having two elongated freely rotatable overlapping ski arms pivotally mounted to a single vertical pivot point shaft fixed at the point of overlap on a sliding pivotal point assembly, said sliding pivot point assembly configured for movement along a longitudinal axis of a supporting T-beam, each elongated freely rotatable overlapping ski arm having a foot pad connected to a heel rest resting on a ground with laces configured to receive a foot of a user at the tail end of each elongated freely rotatable overlapping ski arm;

placing a left foot of the user atop and in alignment with the foot pad of one of the two elongated freely rotatable overlapping ski arms positioned on the ground, wherein a heel of said left foot engages the heel rest, and securely lacing said left foot to said foot pad and heel rest;

placing a right foot of the user atop and in alignment with the foot pad of the other of the two elongated freely rotatable overlapping ski arms positioned on the ground, wherein a heel of said right foot engages the heel rest, and securely lacing said right foot to said foot pad and heel rest;

supporting a body weight of the user in an upright standing position with at least one foot of the user secured to the foot pad positioned on the ground;

assuming a hip flexed position, the hip flexed position comprising:

the body weight of the user being supported by the at least one foot of the user secured to the foot pad positioned on the ground;

a hip of the user being disposed below a height of a hip of the user in the upright standing position;

a femur angle of the user being bent at an angle relative to the ground;

an angle of each knee of the user being bent at an angle;

leaning a body of the user laterally through a sagittal plane of the user;

extending the hip and each knee of the user until the user achieves an elevated position, the elevated position comprising:

the body weight of the user being unsupported by the at least one foot of the user secured to the foot pad whereby said foot pad is vertically free floatingly positioned above the ground without load bearing support;

laterally maneuvering the body of the user from a first position to a second position through the sagittal plane of the user while in the elevated position, said laterally maneuvering the body of the user comprising:

rotating a torso of the user,
tangentially moving the body of the user around the single pivot point engaging the the two elongated freely rotatable overlapping ski arms from a first axial position to a second axial position divergent from the first axial position, wherein moving the body of the user around the single pivot point comprises tangentially moving the right foot and the left foot of the user along the same, congruent and overlapping arc;
returning to the hip flexed position after the step of laterally maneuvering the body of the user.

2. The method claim of 1, wherein the step of placing a left foot of the user atop and in alignment with the foot pad of one of the two elongated freely rotatable overlapping ski arms positioned on the ground further includes parallel alignment of the foot pad of each of the two elongated freely rotatable overlapping ski arms.

3. The method claim of 1, wherein the step of placing a right foot of the user atop and in alignment with the foot pad of one of the two elongated freely rotatable overlapping ski arms positioned on the ground further includes parallel alignment of the foot pad of each of the two elongated freely rotatable overlapping ski arms.

4. The method claim of 1, wherein the two steps of placing the right foot and the left foot of the user atop and in alignment with the foot pad of each of the two elongated freely rotatable overlapping ski arms include parallel alignment of the foot pad of each of the two elongated freely rotatable overlapping ski arms.

5. The method claim of 1, wherein the step of extending the hip and each knee of the user until the user achieves the elevated position further comprises the body weight of the user being vertically unsupported by the right foot and the left foot of the user on the foot pad of each of the two elongated freely rotatable overlapping ski arms floatingly positioned above the ground.

6. The method claim of 1, further comprising radially moving the body of the user from a first position to a second position through a frontal plane of the user while pivoting around the single pivot point engaging the two elongated freely rotatable overlapping ski arms mounted on the sliding pivot point assembly.

7. The method claim of 1, wherein the step of laterally maneuvering the body of the user from a first position to a second position through the sagittal plane of the user while in the elevated position further comprises radially moving the body of the user through the frontal plane of the user around the single pivot point engaging the two elongated freely rotatable overlapping ski arms mounted on the sliding pivot point assembly.

8. The method claim of 1, wherein moving the body of the user around the single pivot point further comprises tangentially moving the right foot and the left foot of the user along the same, congruent and overlapping arc while the right foot and the left foot of the user are aligned in parallel.

* * * * *